United States Patent
Jones

(10) Patent No.: US 8,760,481 B2
(45) Date of Patent: Jun. 24, 2014

(54) APPARATUS, SYSTEM, AND METHOD FOR FLASH PRINTING

(76) Inventor: Mark R. Jones, Seffner, FL (US)

(*) Notice: Subject to any disclaimer, the term of this patent is extended or adjusted under 35 U.S.C. 154(b) by 563 days.

(21) Appl. No.: 12/950,890

(22) Filed: Nov. 19, 2010

(65) Prior Publication Data

US 2011/0122386 A1    May 26, 2011

Related U.S. Application Data

(60) Provisional application No. 61/262,841, filed on Nov. 19, 2009.

(51) Int. Cl.
  B41J 2/325    (2006.01)
  G01D 15/16    (2006.01)
  B41J 17/28    (2006.01)
  B41J 2/435    (2006.01)

(52) U.S. Cl.
  USPC ............................ 347/213; 347/217; 347/264

(58) Field of Classification Search
  USPC ........................................... 347/213, 217, 264
  See application file for complete search history.

(56) References Cited

U.S. PATENT DOCUMENTS

| | | | |
|---|---|---|---|
| 5,156,938 A | 10/1992 | Foley et al. | |
| 5,321,431 A * | 6/1994 | Takeno | 347/232 |
| 5,607,762 A | 3/1997 | Albert et al. | |
| 5,649,774 A | 7/1997 | Harding et al. | |
| 5,766,324 A | 6/1998 | Ikegaya et al. | |
| 5,777,878 A | 7/1998 | Helmrich et al. | |
| 5,832,819 A | 11/1998 | Widman | |
| 5,894,069 A | 4/1999 | Wen et al. | |
| 5,935,709 A | 8/1999 | Yoshida | |
| 5,978,555 A * | 11/1999 | Inoue | 358/1.9 |
| 6,069,680 A | 5/2000 | Kessler et al. | |
| 6,163,363 A | 12/2000 | Nelson et al. | |
| 6,226,020 B1 | 5/2001 | Schuster et al. | |
| 6,326,120 B1 | 12/2001 | Wang et al. | |
| 6,355,393 B1 | 3/2002 | Hirai et al. | |
| 6,538,767 B1 | 3/2003 | Over et al. | |
| 6,544,711 B1 | 4/2003 | Anderson et al. | |
| 6,578,476 B2 | 6/2003 | Liguori et al. | |
| 6,630,998 B1 | 10/2003 | Welchman et al. | |
| 6,638,678 B2 | 10/2003 | Polykarpov et al. | |
| 6,923,115 B1 | 8/2005 | Litscher et al. | |
| 7,133,061 B2 | 11/2006 | Dewa et al. | |

(Continued)

OTHER PUBLICATIONS

Xiaofeng Yuan et al., "Photocleavable Microcapsules Built from Photoreactive Nanospheres", Langmuir vol. 21, No. 20, Jun. 6, 2005.

(Continued)

Primary Examiner — Alessandro Amari
Assistant Examiner — Kendrick Liu
(74) Attorney, Agent, or Firm — Kunzler Law Group

(57) ABSTRACT

An apparatus, system, and method to flash print an image. The apparatus includes an energy source that delivers energy. The apparatus includes an energy pulse width modulator coupled to the energy source. The energy pulse width modulator may receive energy from the energy source and modulate the energy received from the energy source. The energy pulse width modulator may be driven by a logic module. The apparatus also includes a plurality of imaging pixels modulated by the energy pulse width modulator and conveying modulated energy to a host material. The host material may be in close proximity to a receiving medium and the modulated energy may release the dye from the host material into the receiving medium.

19 Claims, 17 Drawing Sheets

(56) References Cited

U.S. PATENT DOCUMENTS

| | | |
|---|---|---|
| 7,173,719 B2 | 2/2007 | Bearss et al. |
| 2003/0025781 A1 | 2/2003 | Honma et al. |
| 2003/0086179 A1* | 5/2003 | Kowarz et al. ............... 359/627 |
| 2009/0050855 A1* | 2/2009 | Majumdar et al. ............ 252/500 |
| 2009/0087759 A1* | 4/2009 | Matsumoto et al. ............. 430/7 |

OTHER PUBLICATIONS

Larry J. Hornbeck, Digial Llght Processing: A New MEMS-Based Display Technology, received on Feb. 21, 2007.

"Zink Zero Ink", http://www.zink.com, downloaded on May 13, 2007.

* cited by examiner

APPARATUS, SYSTEM, AND METHOD FOR FLASH PRINTING

CROSS-REFERENCES TO RELATED APPLICATIONS

This application claims priority to U.S. Provisional Patent Application No. 61/262,841 entitled "APPARATUS, SYSTEM, AND METHOD FOR FLASH PRINTING" and filed on Nov. 19, 2009 for Mark Jones, which is incorporated herein by reference.

BACKGROUND

1. Field

The subject matter herein relates to printing and more particularly relates to flash printing.

2. Description of the Related Art

A typical printer forms an image on a printing surface one digital pixel at a time or moving a printing head that prints multiple digital pixels at a time, often in a single row or line. Furthermore, the printing surface, such as a sheet of paper, and/or the printing head is moved so that the printing head may print digital pixels in other locations on the printing surface to form the image.

As a result, a typical printer includes high precision motors and moving parts to effectuate the movement necessary to produce the entire image. Such motors and parts may be costly and may increase the chance of mechanical malfunction.

SUMMARY

The subject matter of the present application has been developed in response to the present state of the art, and in particular, in response to the problems and needs in the art that have not yet been fully solved under currently available printing technology. Accordingly, the subject matter of the present application has been developed to provide an apparatus, system, and method for flash printing that overcome many or all of the above-discussed shortcomings in the art. Beneficially, such an apparatus, system, and method would print in a single flash without the need for excess moving parts or precision motors.

One embodiment of an apparatus to flash print an image is provided. The apparatus includes an energy source that delivers energy. The apparatus includes an energy pulse width modulator coupled to the energy source. The energy pulse width modulator may receive energy from the energy source and modulate the energy received from the energy source. The energy pulse width modulator may be driven by a logic module. The apparatus also includes a plurality of imaging pixels modulated by the energy pulse width modulator and conveying modulated energy to a host material. The host material may be in close proximity to a receiving medium and the modulated energy may release dye from the host material into the receiving medium.

In one embodiment, the pulse width modulator includes a digital light processor. In a further embodiment, the apparatus includes a filter in between the energy source and the digital light processor. In certain embodiments, the apparatus includes a plurality of filters positionable in between the energy source and the digital light processor. Each filter may select a distinct wavelength. In one embodiment, the energy source includes a laser, an infrared lamp, a light emitting diode, a plurality of lasers wherein each laser emits a distinct wavelength, a plurality of infrared lamps wherein each infrared lamp emits a distinct wavelength, and/or a plurality of light emitting diodes wherein each light emitting diode emits a distinct wavelength.

In one embodiment, the apparatus further includes an optical module that focuses and scales energy from the plurality of imaging pixels onto hosting material in close proximity to the receiving medium. In a further embodiment, the receiving medium includes a curved surface and wherein the optical module focuses and scales the modulated energy to account for the curved surface. In one embodiment, the host material includes a dye ribbon, a plurality of dye-filled microspheres, and/or dye-filled nanoparticles. In one embodiment, the receiving medium includes a substrate for a radio frequency identification substrate. In a further embodiment, the dye includes a conductive ink.

In one embodiment, the receiving medium includes a substrate for receiving Braille lettering. In a further embodiment, the dye includes a clear plastic. In one embodiment, the apparatus further a plurality of pulse width modules arrayed to relay modulated energy over a larger surface array of the receiving medium. In one embodiment, the apparatus includes a finishing module that protects dye in the receiving medium from degradation.

A method is also presented to flash print an image. The method includes emitting energy to an energy pulse width modulator, modulating the energy with the energy pulse width modulator along a plurality of imaging pixels as directed by a logic module, and conveying the modulated energy to a host material, the host material in close proximity to a receiving medium, the modulated energy releasing dye from the host material into the receiving medium. In one embodiment, the host material further includes a plurality of dye-filled microspheres. In this embodiment, conveying the modulated energy to a host material further includes reflecting light from a matrix of micro mirrors to the plurality of dye-filled microspheres and activating the microspheres with the reflected light, to release dye in various volumes from the microspheres.

In one embodiment, modulating the energy with the energy pulse width modulator further includes modulating the energy to convey a distinct pulse-width value. In a further embodiment, the method includes focusing and scaling the distinct pulse-width value. In one embodiment, the receiving medium includes a curved surface and the method further includes focusing and scaling the modulated energy to account for the curved surface. In a further embodiment, the host material further includes a plurality of dye-filled microspheres. The method further includes attaching the plurality of dye-filled microspheres to the curved surface.

In one embodiment, emitting energy to an energy pulse width modulator further includes emitting a first instance energy, emitting a second instance energy, and emitting a third instance energy. In one embodiment, modulating the energy with the energy pulse width modulator further includes modulating the first instance energy to convey a first distinct pulse-width value, modulating the second instance energy to convey a second distinct pulse-width value, and modulating the third instance energy to convey a third distinct pulse-width value. In certain embodiments, conveying the modulated energy to a host material further includes conveying the first pulse-width value to the host material wherein the host material releases a first dye, conveying the second pulse-width value to the host material wherein the host material releases a second dye, and conveying the third pulse-width value to the host material wherein the host material releases a third dye.

One embodiment of a system is also included to flash print an image. The system includes an energy source that delivers energy. The system also includes an energy pulse width modulator coupled to the energy source. The energy pulse width modulator may receive energy from the energy source and modulate the energy received from the energy source. The system also includes a logic module driving the energy pulse width modulator. The system also includes a plurality of imaging pixels modulated by the energy pulse width modulator and conveying modulated energy to a host material. The system also includes a host material receiving modulated energy from the plurality of imaging pixels. The host material may be in close proximity to a receiving medium. The host material may include dye and release the dye into the receiving medium according to the modulated energy.

BRIEF DESCRIPTION OF THE DRAWINGS

In order that the advantages of the present subject matter will be readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the present subject matter will be described and explained with additional specificity and detail through the use of the accompanying drawings, in which.

DETAILED DESCRIPTION

Figure 1:
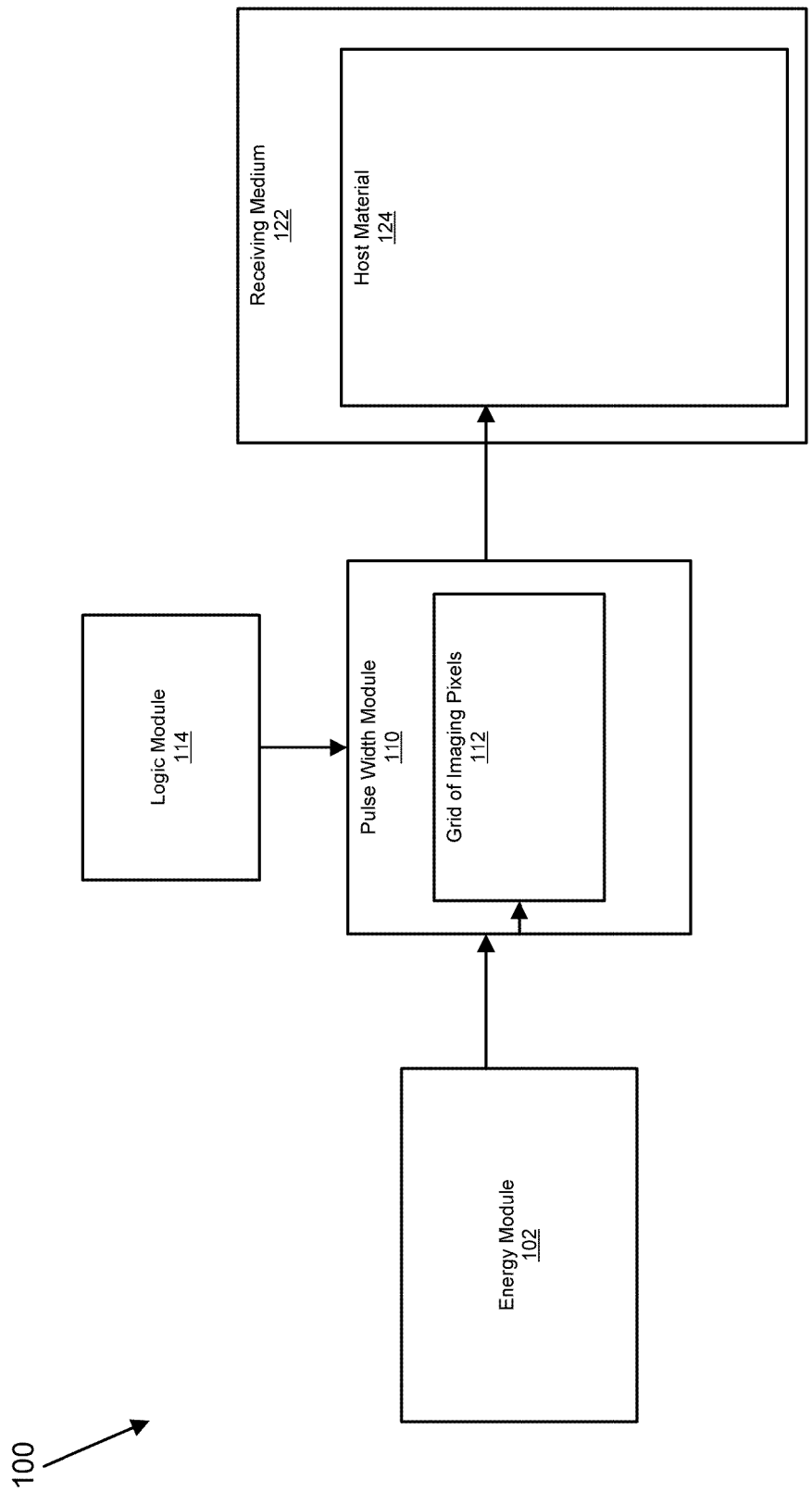
FIG. 1 is a schematic block diagram illustrating one embodiment of a system for flash printing in accordance with the present subject matter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. A module may also be implemented with machinery.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Reference throughout this specification to "one embodiment," "an embodiment," or similar language means that a particular feature, structure, or characteristic described in connection with the embodiment is included in at least one embodiment of the subject matter disclosed herein. Thus, appearances of the phrases "in one embodiment," "in an embodiment," and similar language throughout this specification may, but do not necessarily, all refer to the same embodiment.

Furthermore, the described features, structures, or characteristics of the subject matter may be combined in any suitable manner in one or more embodiments. In the following description, numerous specific details are provided. One skilled in the relevant art will recognize, however, that the subject matter disclosed herein may be practiced without one or more of the specific details, or with other methods, components, materials, and so forth. In other instances, well-known structures, materials, or operations are not shown or described in detail to avoid obscuring aspects of the present subject matter.

FIG. 1 depicts a schematic block diagram illustrating one embodiment of a system 100 for flash printing in accordance with the present subject matter. The system 100 includes an energy module 102, a pulse width module 110, a logic module 114, a receiving medium 122, and a host material 124. The various components of the system 100 may cooperate to flash print an image on the receiving medium 122.

The energy module 102 is an energy source that may provide energy by radiating an electromagnetic field. The resultant energy may manifest itself as light, heat, a charge, and/or the like. In certain embodiments, the energy module 102 may include an infrared lamp, in other embodiments, the energy module 102 may include a light emitting diode. In additional embodiments, the energy module 102 may include a laser. In further embodiments, the energy module 102 may include a simple light bulb. Embodiments that include a light bulb may also include a filter to select a certain wavelength. The energy module 102 may be configured to provide energy in terms of at least one specific wavelength, at least one specific frequency or in terms of at least one specific power value.

The energy module 102 provides energy to the pulse width module 110. The pulse width module 110 takes the energy from the energy module 102 and modulates the pulse width of the energy over a grid of imaging pixels 112. Each imaging pixel of the grid of imaging pixels 112 included in the pulse width module 110 may be modulated by a logic module 114 to communicate a pulse width value, distinct for each imaging pixel, to the receiving medium 122 and/or host material 124.

Pulse width may be defined in several ways. In certain embodiments, pulse width is defined by the time the receiving medium 122 is exposed to a certain form of energy, defined in terms of wavelength, frequency, power, and/or the like. In other embodiments, pulse width is defined as the magnitude of the energy communicated to the receiving medium 122. In further embodiments, pulse width is defined as the physical width of the energy communicated to the receiving medium 122 and/or host material 124.

The logic module 114 may control operation of the system 100. Specifically, the logic module 114 is in communication with and drives the pulse width module 110 by providing a value for the pulse width communicated by each imaging pixel of the group of imaging pixels 112 to the receiving medium 122. The logic module 114 may determine suitable values for the pulse width based on an image to be printed. For example, the logic module 114 may determine appropriate pulse width values based on characteristics of a particular image such as color, shading (darkness of tones), and the like. In certain embodiments, the logic module 114 receives and/or determines pulse width values from/through a software and/or hardware application, utility, and/or driver embodied by and/or in communication with the logic module 114. In one embodiment, the logic module 114 includes and/or is in communication with a software program allowing a user to select an image for flash printing.

The logic module 114 may communicate with the pulse width module 110 using electronic signals and/or any other suitable means. The logic module 114 may comprise a digital processor, memory, modules comprising software and/or hardware as described above, and/or the like. In one embodiment, at least a portion of the logic module 114 is embodied as a controller onboard a flash printer. At least a portion of the logic module 114 may also be embodied as a desktop computer, a portable computer, a server, a mainframe computer, a handheld computing device, a touch device, a personal desktop assistant ("PDA"), a tablet computer, and the like. The array of pulse width values communicated from the pulse width module 110 to the receiving medium 122 and/or host material 124 ultimately generates an image on the receiving medium 122.

A pulse width value communicated from a single imaging pixel from the group of imaging pixels 112 may impinge on the receiving medium 122 and/or host material 124. The receiving medium 122 may be sensitive to energy in the various pulse width values communicated to the receiving medium 122. Depending on the amount of energy adsorbed from a particular pulse width value in a particular region of the receiving medium 122 and/or host material 124, a tone value may be produced on the receiving medium 122/host material 124 in that region. Higher pulse width values may produce darker tones. The collections of tone values across the receiving medium 122/host material 124 may result in an image. Therefore, the receiving medium 122 and/or host material 124 receives the image from the flash printer 100 in a single "flash."

The host material 124 may be in close proximity to the receiving medium 122. Close proximity may include being in contact with the receiving medium 122, just above the receiving medium, and the like. In other embodiments, the host material 124 may be embodied on the receiving medium 122, operatively connected to the receiving medium 122, attached to the receiving medium 122, integrated with the receiving medium 122, embedded in the receiving medium 122, and/or adjacent to the receiving medium 122. The host material 124 may enable printing and/or production of tone values on the receiving material 122. As described below, the host material 124 may include dye and/or ink. In certain embodiments, the host material 124 includes dye and/or ink filled microspheres, nanospheres, and/or the like described in detail below. In one embodiment, the host material 124 is a heat-sensitive ribbon as described below.

Although the depicted embodiment includes a host material 124, in certain embodiments, the system 100 does not use a host material 124. Specifically, in these embodiments, the receiving medium 122 is configured to produce tone values. In certain embodiments, the receiving medium 122 is a light sensitive film. In certain embodiments, the light sensitive film is silver halide based. In other embodiments the receiving medium 122 works by a process of electro-photography. Additional embodiments will be apparent to those of relevant skill in the art.

In some embodiments, the receiving medium 122 has a substantially flat surface. In one embodiment, the receiving medium 122 is a curved surface.

Figure 2:
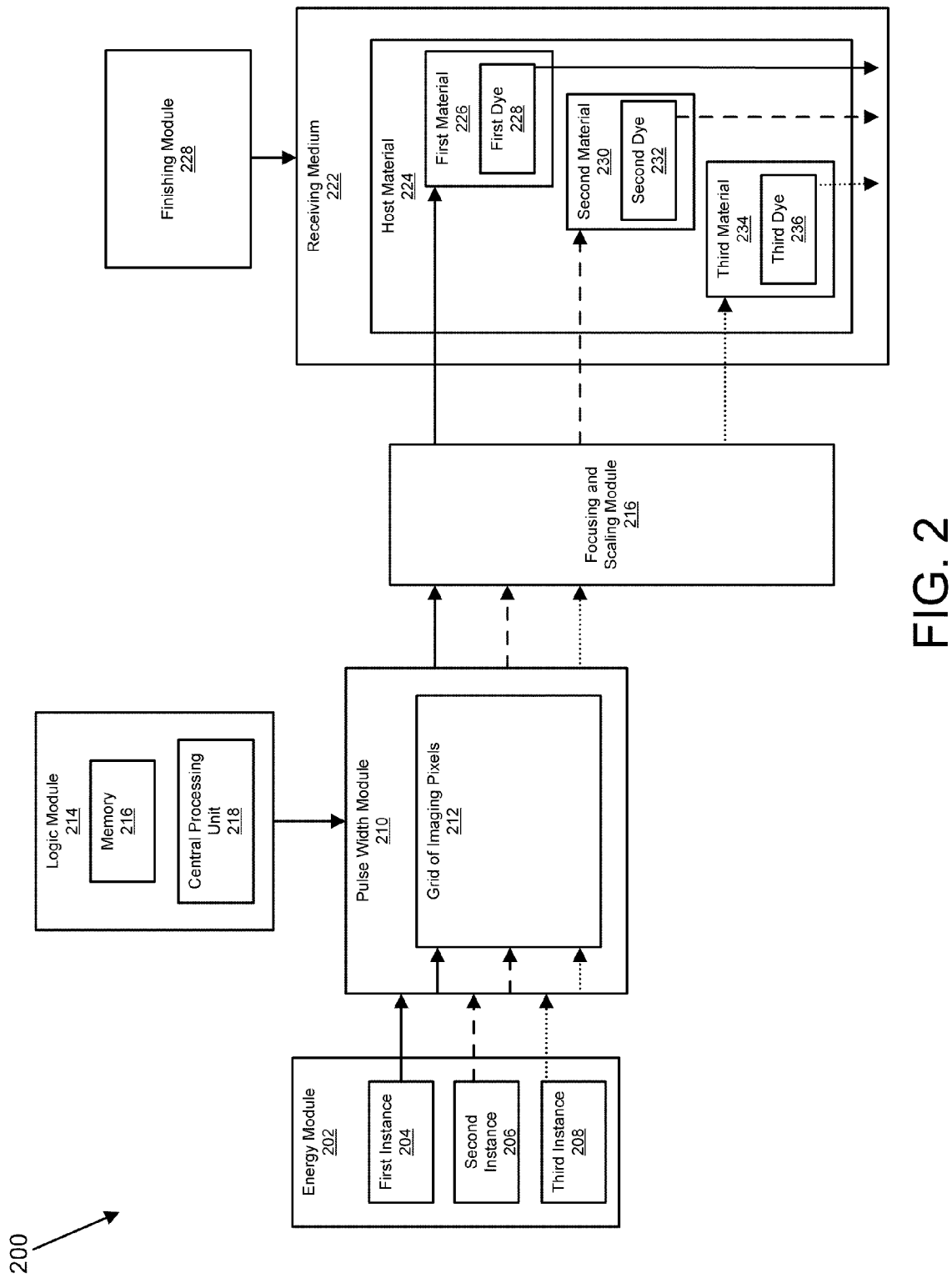
FIG. 2 is a schematic block diagram illustrating another embodiment of a system for flash printing in accordance with the present subject matter.

FIG. 2 depicts a schematic block diagram illustrating a second embodiment of a system 200 for flash printing in accordance with the present subject matter. The system 200 includes an energy module 202, a pulse width module 210, a logic module 214, a focusing and scaling module 216, a receiving medium 222, and a finishing module 228. The various components of the flash printer 200 cooperate to flash print an image on the receiving medium 222.

The energy module 202, the pulse width module 210, the logic module 214, the receiving medium 222, and the host material 224 may be substantially similar to those components of the same name depicted in FIG. 1. However, the energy module 202 includes a first instance 204, a second instance 206, and a third instance 208. Each instance may be a source of energy that is unique in some way, whether in terms of wavelength, frequency, or power.

The first instance 204 provides energy to the pulse width module 210, which may be driven by the logic module 214, to modulate the energy to a specific pulse width value on each imaging pixel of a grid of imaging pixels 212. The grid of imaging pixels 212, in turn, flash an image on the receiving medium 222 in a color particular to energy source of the first instance 204. The tone of the color on the receiving medium 222 varies in accordance with the pulse width value communicated from the imaging pixel corresponding to that region.

After the first instance 204 has flashed a color image on the receiving medium 222, the second instance 202 may provide a particular form of energy capable of flashing a second color on the receiving medium 222. The logic module 214 drives the pulse width module to modulate the grid of imaging pixels 212 to communicate distinct pulse width values for the second color being flashed to the receiving medium 222.

When the second instance 206 is complete, the third instance 208 may flash an image for a third color on the receiving medium 222. The combination of the three overlapping color images, with their varying tones, produces a final color image. Pulse width values for producing each intermediary color image contributing to the final color image may be provided by the logic module 214. These values may be stored in memory 216 may be generated by an interaction between memory 216 and a central processing unit 218 within the logic module 214.

The system 200 includes a focusing and scaling module 216. The focusing and scaling module 216 insures that energy communicated in the form of pulse width values may be communicated to the desired regions of the receiving medium 222 while maintaining the proper pulse width values. In embodiments where the various instances 204, 206, 208 of the energy module 202 provide energy in the form of light, whether infrared or visible, the focusing and scaling module 216 will include a system of optics. In other embodiments, the focusing and scaling module 216 may include a system for amplifying energy.

The receiving medium 222 includes a host material 224. The host material 224 is comprised of a first material 226 carrying a first dye 228, a second material 230 carrying a second dye 232, and a third material 234 carrying a third dye 236. The first material 226 may be sensitive to the particular frequency, wavelength, or power associated with the first instance 204. Similarly, the second material 230 may be sensitive to the particular frequency, wavelength, or power associated with the second instance 206. Also, the third material 234 may be sensitive to the particular frequency, wavelength, or power associated with the third instance 208.

A discussion of the first material 226 illustrates the second material 230 and the third material 234. The first instance 204 generates energy with a particular wavelength, frequency, or power. This energy is modulated by the pulse width module 210, and a single imaging pixel from the group of imaging pixels 212 communicates a particular pulse width value that impinges on the first material 226 of the host material 224, which is embedded throughout, in close proximity to, integrated with, and/or adjacent to the receiving medium 222. The first material 226 adsorbs the energy carried in the particular pulse width value. In response to adsorbing a certain amount of energy at a particular wavelength, frequency, or power, the first material 226 releases a certain amount of the first dye 228. The amount of first dye 126 released from the first material 126 then adsorbs into the receiving medium 122.

The amount of first dye 228 released from the first material 226 depends on the amount of energy adsorbed. A high pulse width value carries a large amount of energy. The greater the energy, the greater the statistical likelihood that large amounts of first dye 228 will be released from the first material 226 and adsorbed into the receiving material 222. The statistical probability of varying amounts of first dye 228 being released from the first material 226 at different pulse width values varies with the particular first material 226 employed. A person of ordinary skill in the art can determine the relationship between the amount of first dye 228 released and the pulse width value through knowledge of the particular first material 226 selected and/or by deriving the relationship from empirical measurements.

Each pulse width value, which carries energy to release a particular amount of first dye 126, may be generated simultaneously, resulting in a simultaneous array of pulse width values. The simultaneous array of pulse width values simultaneously impinging on the host material 224, results in first dye 228 being simultaneously released in different amounts from the first material 226 at different regions of the receiving material 222. The receiving material 222, therefore, receives the image from the flash printer 100 in a single "flash." Because the system 200 prints an entire image in a single flash, as opposed to printing an image a single pixel or row of pixels at a time, the system has no need of moving parts or expensive high precision motor(s) to move a printing head across the receiving medium 222.

Because the second material 230 and the third material 234 are not sensitive to the particular wavelength, frequency, or power emitted by the first instance 204, second dye 232 and third dye 236 are not released into the receiving medium 222. Second dye 232 and third dye 236 are released into the receiving medium 222 when the second instance 206 and the third instance 208 emit their wavelength, frequency, or power unique energies. The pulse width module 210 uses the grid of imaging pixels 212 to create a distinct set of pulse width values for the first instance 204, the second instance 206, and the third instance 208. Each set of pulse width values may be focused and scaled onto the various regions of receiving medium 222 by the focusing and scaling module 216.

The first dye 228, second dye 232, and third dye 236 may be each a different color. In certain embodiments, the first dye 228 is cyan; the second dye 232 is magenta; and, the third dye 236 is yellow. The combination of the three dyes, released into the receiving medium 222 in varying amounts in different regions of the receiving medium 222, produces a color image.

In certain embodiments, the first material 226, the second material 230, and the third material 234 are comprised of various types of microspheres (not shown). The various kinds and uses of microspheres are well known to those of skill in the relevant art. The microspheres are embedded in the receiving medium 222 and comprise an outer shell (not shown) that may be sensitive to a particular wavelength, frequency, or power and a dye (not shown) that is encased in the outer shell. When a sufficient amount of energy of the correct wavelength, frequency, or power impinges on a microsphere, the microsphere releases its dye. The greater the pulse width of the energy the greater the statistical likelihood that more microspheres will release their dye.

As nanosphere technology is developed and comes available, those of relevant skill in the art will know how to make use of nanospheres in a manner similar to that of microspheres. In certain embodiments, when the technology is fully developed, photo reactive nano-particles (not shown) may be embedded directly in the receiving medium 222, without being carried in the host material 224. Such photo reactive nano-particles are invisible until acted upon by a certain amount of electromagnetic energy of the proper wavelength, frequency, or power. After being acted upon by a certain amount of electromagnetic energy of the proper wavelength, frequency, or power, however, the photo reactive nano-particles become a dye. The greater the pulse width of the energy impinging on the photo reactive nano-particles, the greater the amount of dye that is produced.

The flash printer 200 also includes a finishing module 228. After the third instance 208 of the energy module 202 has flashed its color image on the receiving medium, and the overall color image is complete, the finishing module 228 may apply a coating of one of a variety of finishing materials known to those of ordinary skill in the relevant art to protect against ultraviolet light and other potential sources of damage to the image. In one embodiment, the finishing module 228 includes a lamp to facilitate a chemical reaction on the receiving medium 222 to form an overcoat.

Figure 3:
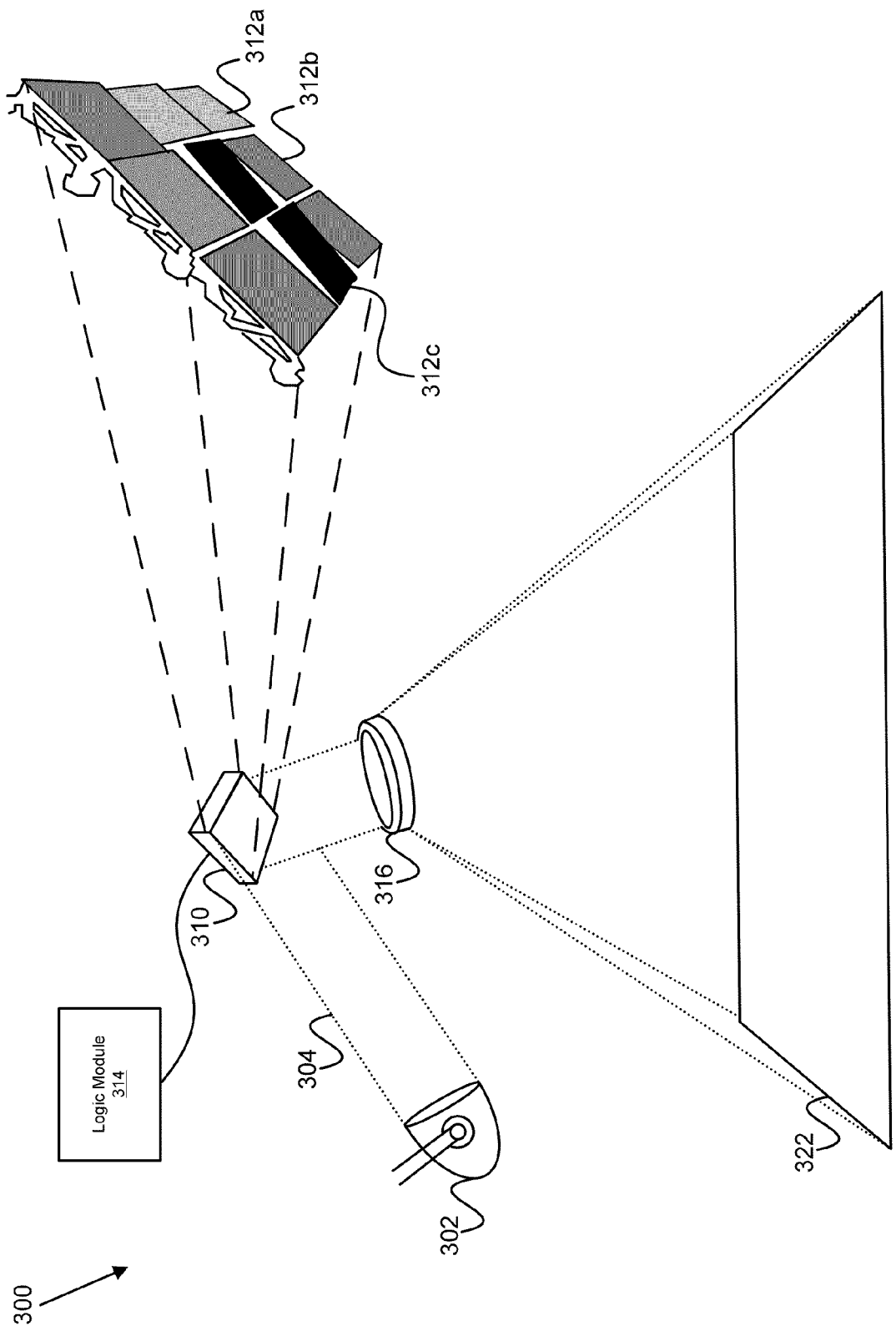
FIG. 3 is a side perspective view illustrating one embodiment of a flash printer utilizing a digital light processor, with an exploded perspective view of the digital light processor.

FIG. 3 depicts a side perspective view illustrating one embodiment of a flash printer 300 utilizing a digital light processor, with an exploded perspective view of the digital light processor. The flash printer 300 includes a light source 302, a digital light processor 310, a logic module 314, an optical module 316, and a receiving medium 322. The various components of the flash printer 300 cooperate to flash print an image on the receiving medium 322.

The light source 302 emits a beam of light 304 directed to the digital light processor 310. The digital light processor 310 may be a circuit created by a Very Large Scale Integration (VLSI) process. The VLSI process produces an array of micro mirrors 312a-n. In certain embodiments, the arrays are about half an inch across and about three-tenths of an inch tall. Within the half inch, there are about 2000 columns of micro mirrors 312a-n. Within the three-tenths of an inch, there are about 1000 rows of micro mirrors, resulting in a two-dimensional array of about 2 million micro mirrors 312a-n.

Each micro mirror 312n can be positioned in different directions with respect to the beam of light 304. Certain micro mirrors 312 are positioned to receive light from the light beam 304 and to redirect that light to the receiving medium 322. Light receiving micro mirrors are said to be in the receiving position 312a. Other micro mirrors 312 are directed away from the light beam 304 and do not redirect light to the receiving medium, such mirrors are in the oblique position 312c. Other micro mirrors 312, moving between the receiving position 312a and the oblique position 312c, are in transitional positions 312b.

The amount of time in a single cycle that a particular micro mirror 312 spends in the receiving position 312a determines the value of the pulse width communicated from the particular micro mirror 312. In certain embodiments, a cycle may be a millisecond. Furthermore, in certain embodiments, a micro mirror is capable of moving between the receiving position 312a and the oblique position 312c 4,096 times, allowing for 4,906 different values for each pulse width, which translates into 4,096 tonal values on the receiving medium 322.

The amount of time spent by each micro mirror 312a-n in any given cycle in the receiving position 312a may be determined by a logic module 314 driving the digital light processor 310. Each pulse width value (not shown) reflected from each micro mirror 312 may then pass through an optical module 316 that focuses and scales the pulse width value to impinge on the proper region of the receiving medium 322. The receiving medium may be substantially similar to the receiving medium 122 depicted with respect to FIG. 1, or the receiving medium 222 depicted with respect to FIG. 2, and produces an image derived from the array of pulse width values as discussed above. Furthermore, the receiving medium 322 may also include a host material as described above.

In certain embodiments, the receiving medium 322 may be large. Since the resolution of the flash printer 300 is fixed to the number of micro mirrors 312a-n in the digital light processor 310, resolution may be a problem with large receiving mediums 322. The resolution problem for large receiving mediums 322 may be solved using the flash printer 300 to print multiple quadrants (not shown), one at a time. The resolution can be increased in this way by a factor equal to the number of quadrants. In certain embodiments, a mirror (not shown) can be used to direct the flash printer 300 from one quadrant to the next.

Figure 4:
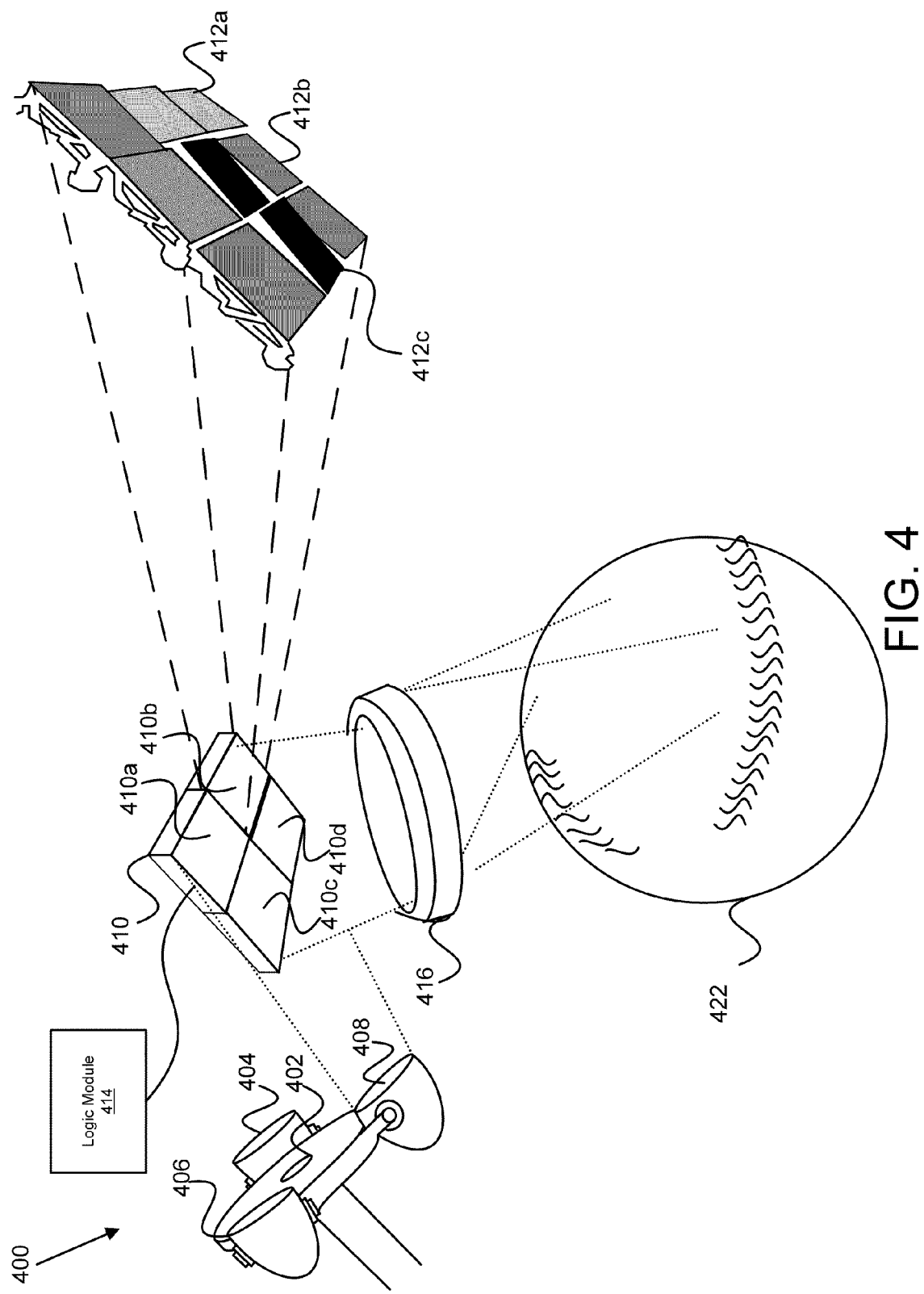
FIG. 4 is a side perspective view illustrating a second embodiment of a flash printer utilizing multiple light sources, an array of digital light processors, and a three-dimensional optical module with an exploded perspective view of one of the digital light processors in the array.

FIG. 4 depicts a side perspective view illustrating a second embodiment of a flash printer 400 utilizing multiple light sources, an array of digital light processors, and a three-dimensional optical module. The flash printer 400 includes multiple light sources 402, an array of digital light processors 410, a logic module 414, a three-dimensional optical module 416, and a three-dimensional object 422. The various components of the flash printer 400 cooperate to flash print an image onto the three-dimensional object 422. The three-dimensional object 422 may include one or more curved surfaces.

Each individual light source of the multiple light sources 402, each digital light processor of the array of digital light processors 410, the logic module 414, and the optical module 416 may be substantially similar to those components of the same name depicted in FIGS. 1-3 above. However, each light source 404, 406, 408 of the multiple light sources 402 has a distinct wavelength or power associated with it. In certain embodiments the multiple light sources 402 rotate between one another. Each distinct wavelength or frequency may be used to print a different color.

Light from the multiple light source is directed toward the digital light processor array 410. The digital light processor array 410 is comprised of several rows and columns of individual digital light processors 410a-410c similar to the digital light processor 310 depicted in FIG. 3. By arraying the individual digital light processors 410a-410c, the number of distinct pulse width values increases by a factor equal to the number of digital light processors 410a-410c in the array.

Light redirected by the digital light processor array 410 passes through a three-dimensional optical module 416. The three-dimensional optical module 416 may perform operations of focusing and scaling similar to those performed by the optical module 310 depicted in FIG. 3, however, the three-dimensional optical module 416 performs these operations for flash printing onto a three dimensional object 422. In certain embodiments, the three-dimensional object may be round like the baseball depicted in FIG. 4. However, all sorts of three-dimensional shapes are possible. In certain embodiments, the logic module 414 may assist the three-dimensional printing process by taking into account distance and increasing the pulse-width value for regions on the three-dimensional object 422 that are further away from the flash printer 400 and decreasing the pulse-width value for regions on the three-dimensional object 422 that are closer. In one embodiment, a host material (e.g. a plurality of dye-filled microspheres) may be attached to the surface of the three-dimensional object 422.

Figure 5:
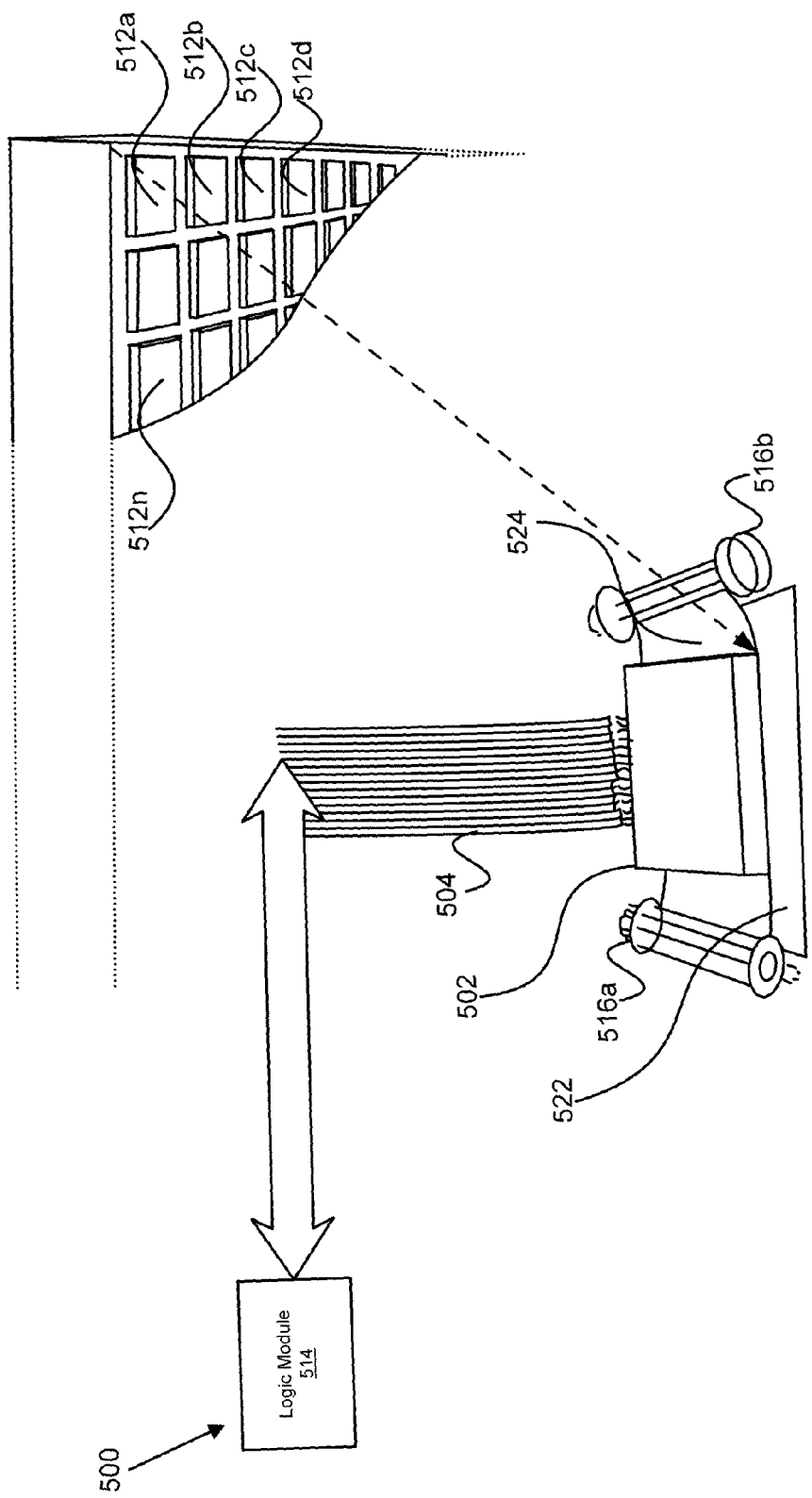
FIG. 5 is a top perspective view of a flash printer utilizing a heating bar and a heat-sensitive ribbon, with an exploded perspective view of a corner portion of the underside of the heat bar.

FIG. 5 depicts a top perspective view of a flash printer utilizing a heating bar and a ribbon, with an exploded perspective view of a corner portion of the underside of the heat bar. The flash printer 500 includes a heat bar 502, a heat-sensitive ribbon 524, a ribbon scroll 516a, 516b, and a receiving medium 522. The various components of the flash printer 500 cooperate to flash print an image on the receiving medium 522.

The heating bar 502 is connected by a wire 504, which in certain embodiments is ribbon cable, to a logic module 514. The logic module 514 drives the heat bar 502, controlling the amount of heat conveyed by each of a series of imaging pixels 512a-512n. The imaging pixels 512a-512n are in physical contact with the heat-sensitive ribbon 524, which is, in turn, in contact with the receiving medium 522. The heat-sensitive ribbon 524 may be one embodiment of the host material described above. In certain embodiments, the heat bar 502, the heat sensitive ribbon 524, and the receiving medium 522 are brought in sufficient contact one with another by a suction mechanism (not shown).

Heat conveyed to the heat sensitive ribbon 524 by the imaging pixels 512a-512n of the heat bar 502 acts on the heat sensitive ribbon 524 to sublimate dye (not shown) from the heat sensitive ribbon 524 that is adsorbed by the receiving medium 522 in contact with the heat sensitive ribbon 524. The amount of heat at each imaging pixel 512n determines that amount of dye that sublimated from the heat-sensitive ribbon 524. The amount of dye sublimated from the heat-sensitive ribbon 524 in any given region may be substantially equal to the amount of dye adsorbed by the region of the receiving medium 522 in contact with the particular region of the heat-sensitive ribbon 524 at issue. Since the logic module 514 simultaneously drives the heat bar 502 to conduct distinct heat values at each of the imaging pixels 512a-512n, the flash printer is able to print an image simultaneously, without having to move from region to region of the receiving medium 522.

Figure 6:
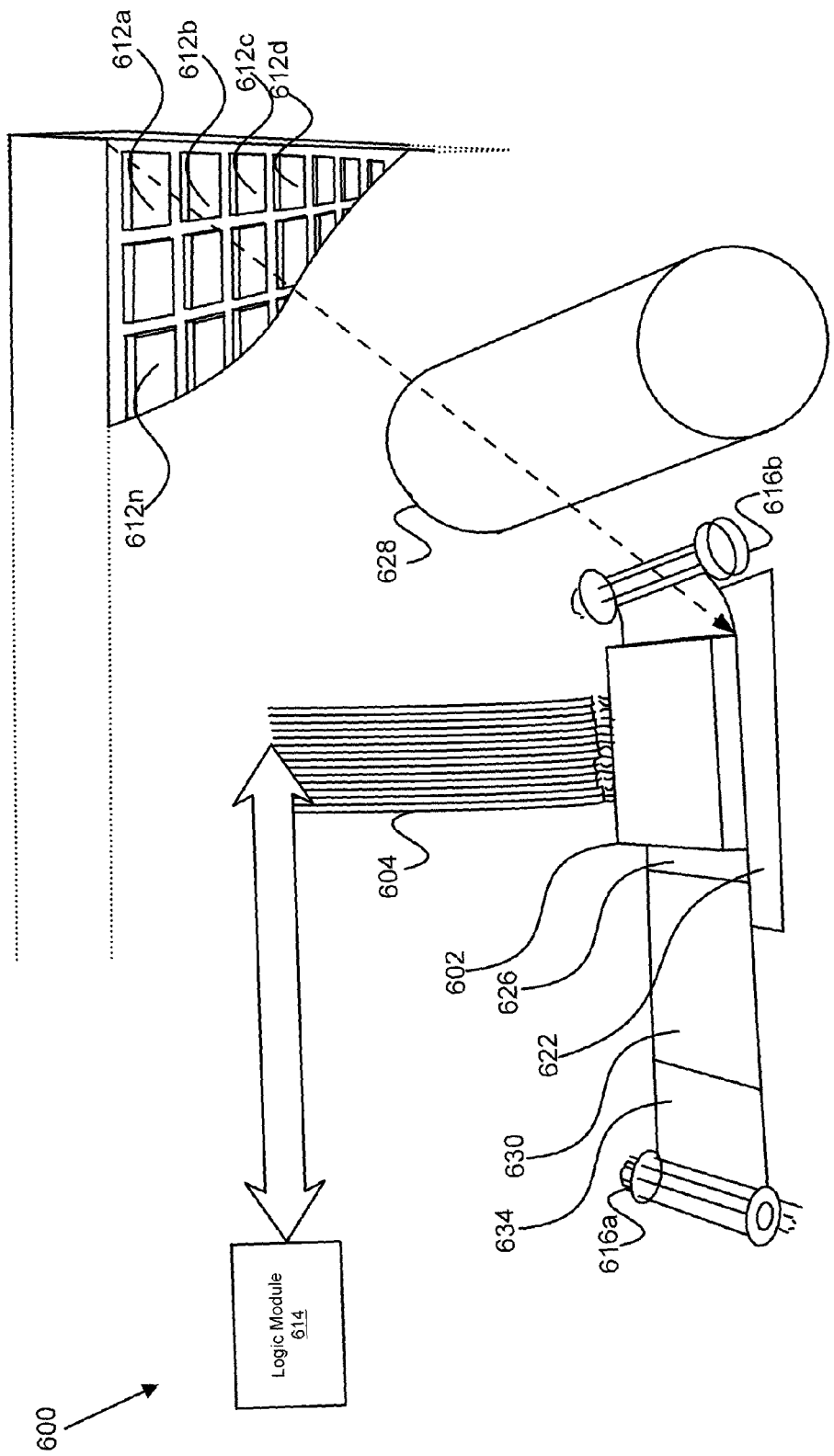
FIG. 6 is a top perspective view of a flash printer utilizing a heating bar, a three-part, heat-sensitive ribbon, and a finishing module, with an exploded perspective view of a corner portion of the underside of the heat bar.

FIG. 6 depicts a top perspective view of a flash printer utilizing a heating bar, a three-part, heat-sensitive ribbon, and a finishing module, with an exploded perspective view of a corner portion of the underside of the heat bar. The flash printer 600 includes a heat bar 602, a three-part, heat-sensitive ribbon 624, a logic module 614, a two-part ribbon scroll 616a, 616b, a receiving medium 622, and a finishing module 628. The various components of the flash printer 600 cooperate to flash print an image on the receiving medium 622.

The heat bar 602, the wire 604, the logic module 614, the two-part ribbon scroll 616a, 616b, and the receiving medium 622, are substantially similar to those components of the same name depicted in FIG. 5. Furthermore, the finishing module 528 is also substantially similar to the finishing module 328 of the same name depicted in FIG. 3. However, although the three-part, heat-sensitive ribbon 624 is substantially similar to the heat-sensitive ribbon 524 depicted in FIG. 5 in many ways, the three-part, heat-sensitive ribbon 624 includes three parts. The three-part, heat-sensitive ribbon 624, has a first dye region 626, a second dye region 630, and a third dye region 634.

The dye in each of the three dye regions 626, 630, 634 may be distinct. In certain embodiments, the dye in the first dye region 626 is cyan; the dye in the second dye region 630 in magenta; and, the dye in the third dye region 634 is yellow. The heat-sensitive regions are rolled from one dye region 626 to the next dye region 630 by both ends 616a, 616b of the ribbon scroll 616. Each dye region 626, 630, 634 pauses under the heat bar 602 long enough for the logic module 614 to drive each of the imaging pixels 612a-612n to convey a specific heat value to the particular dye region 626, 630, 634, which sublimates its particular color of dye for adsorption by the receiving medium 622. After all three dye regions 626, 630, 634 have sublimated dye, a color image remains on the receiving medium 622. In certain embodiments, the heat bar 602 may have a curvature to match the curvature of a three-dimensional receiving medium 622.

Figure 7:
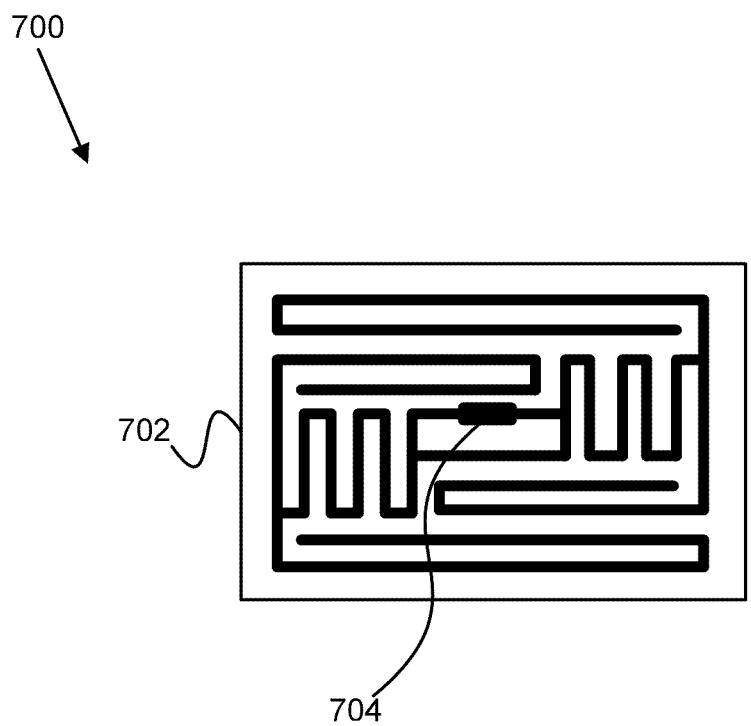
FIG. 7 is a top view of a Radio Frequency Identification Circuit flash printed by an embodiment of the current subject matter.

FIG. 7 depicts a top view of a Radio Frequency Identification Circuit (RFID) 700 flash printed by the current subject matter. A RFID is a transponder that receives electromagnetic energy at one wavelength, inducing a current in its circuitry. The current in the circuitry then transmits a new and different electromagnetic frequency. Design parameters for the circuitry depend on the application and are well known to those of ordinary skill in the relevant art. The RFID 700 depicted in FIG. 7 includes a substrate 702 and conductive ink 704. In certain embodiments of the present subject matter, the conductive ink 704 is flash printed on the substrate by any of the methods discussed with respect to FIGS. 1-6. In certain embodiments, the substrate 702 is a flat surface. In other embodiments, the substrate 702 is a three-dimensional object.

Figure 8:
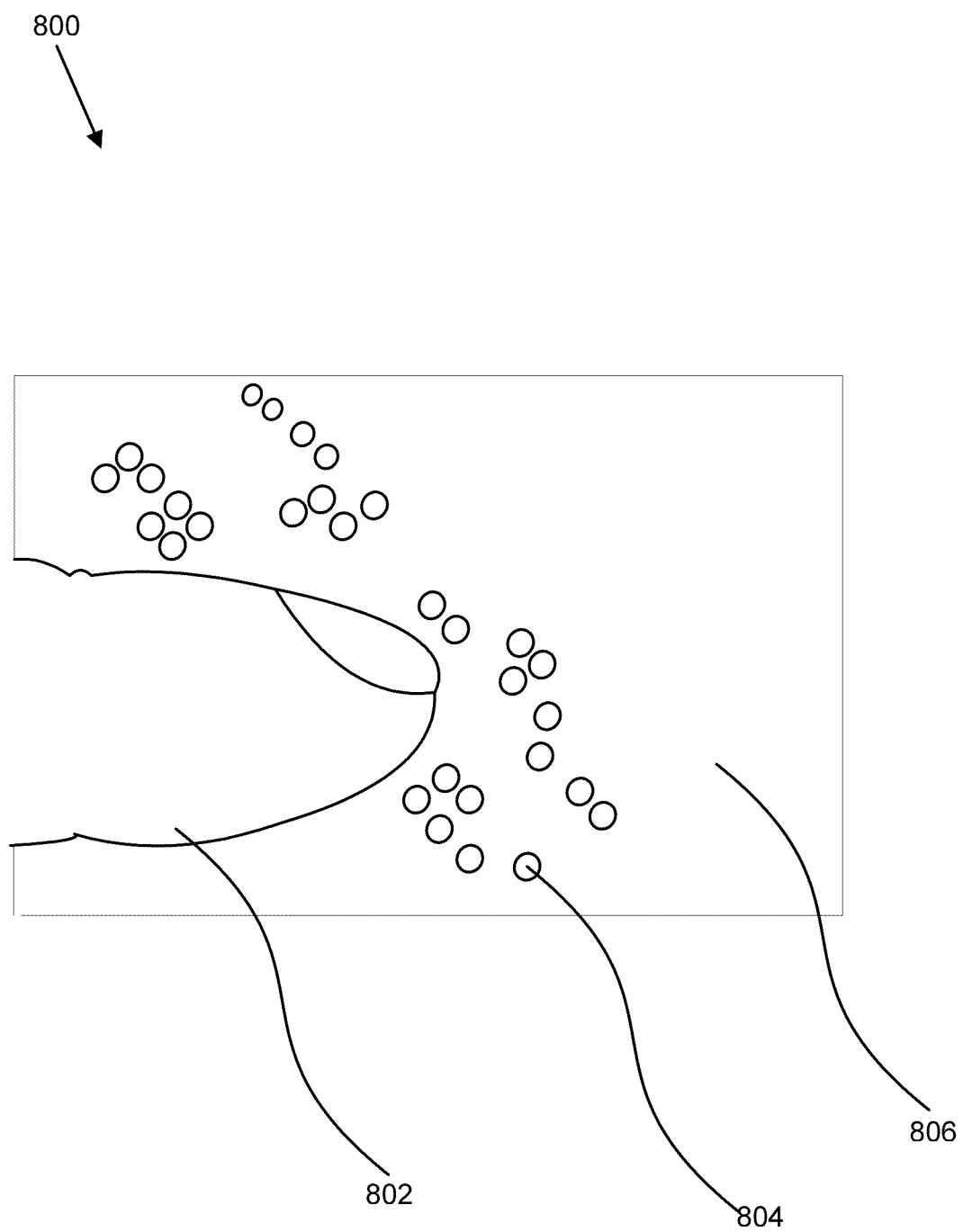
FIG. 8 is a top view of Braille lettering flash printed by an embodiment of the current subject matter.

FIG. 8 depicts a top view of Braille lettering 800 flash printed by the current subject matter. FIG. 8 depicts a human finger 802 traversing a series of raised ink dots 804. The series of raised ink dots 804 form letters in the Braille alphabet. In certain embodiments, the series of raised ink dots 804 are formed with clear ink. The series of raised ink dots 804 are flash printed on a substrate 806 by any of the methods discussed with respect to FIGS. 1-6. In certain embodiments, the substrate 806 is a flat surface. In other embodiments, the substrate 806 is a three-dimensional object.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
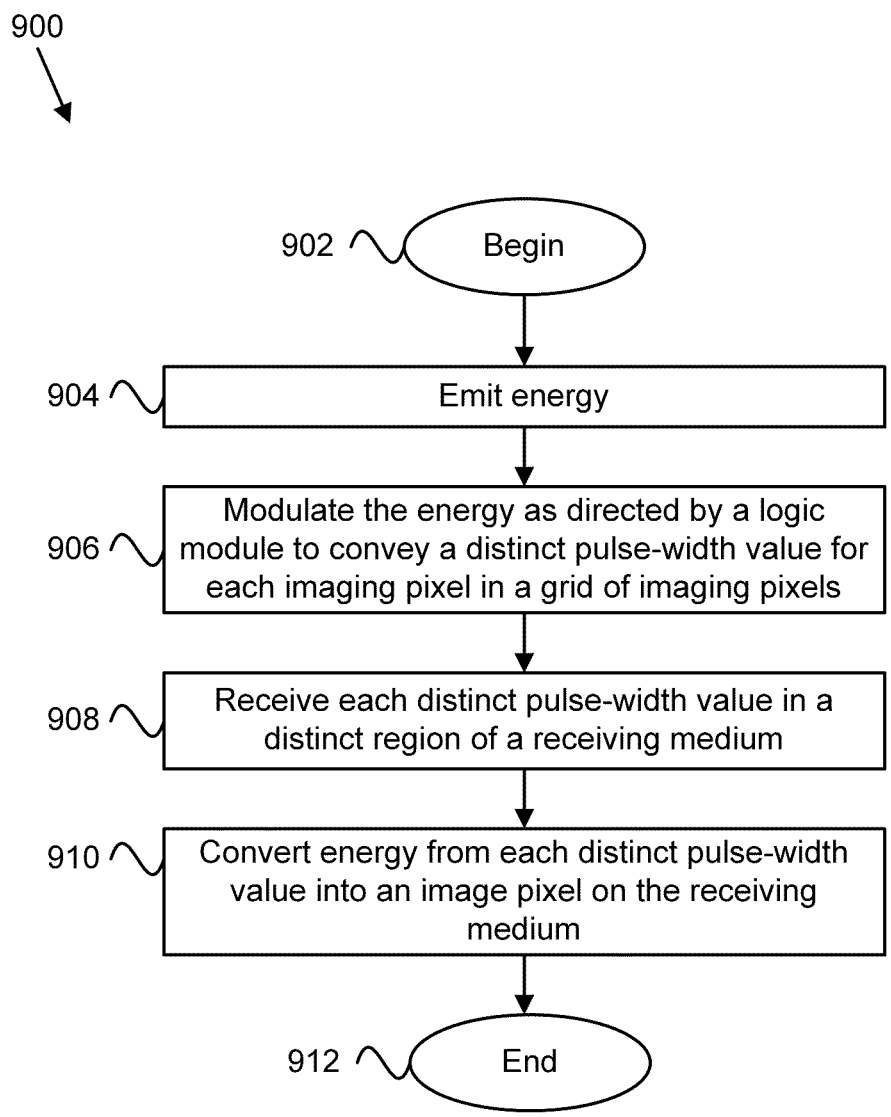
FIG. 9 is a schematic flow chart diagram illustrating one embodiment of a flash printing method in accordance with the present subject matter.

FIG. 9 is a schematic flow chart diagram illustrating one embodiment of a flash printing method 900 in accordance with the present subject matter. The method 900 begins 902 and an energy module 102 emits 904 energy. The pulse width module 110 then modulates 906 the energy as directed by a logic module 114 to convey a distinct pulse-width value for each imaging pixel in a grid of imaging pixels 112.

The logic module 114 stores and/or processes digital information about how to modulate 906 each imaging pixel in the grid of imaging pixels 112 so as to realize an image (not shown) on a receiving medium 122. Next, the receiving medium 122 and/or host material 124 receives 908 each distinct pulse-width value in a distinct region of the receiving medium 122 and/or host material 124. The receiving medium 122 and/or host material 124 converts 910 energy from each distinct pulse-width value into an image pixel on the receiving medium 122 in one of the manners discussed above with respect to FIGS. 1-6, and the method 900 ends 912. In certain embodiments, the imaging pixel embodies the conductive ink 704 of FIG. 7, resulting in a RFID 700. In some embodiments, the imaging pixel embodies the raised ink dots 804 of FIG. 8, resulting in Braille lettering 800.

Figure 10A:
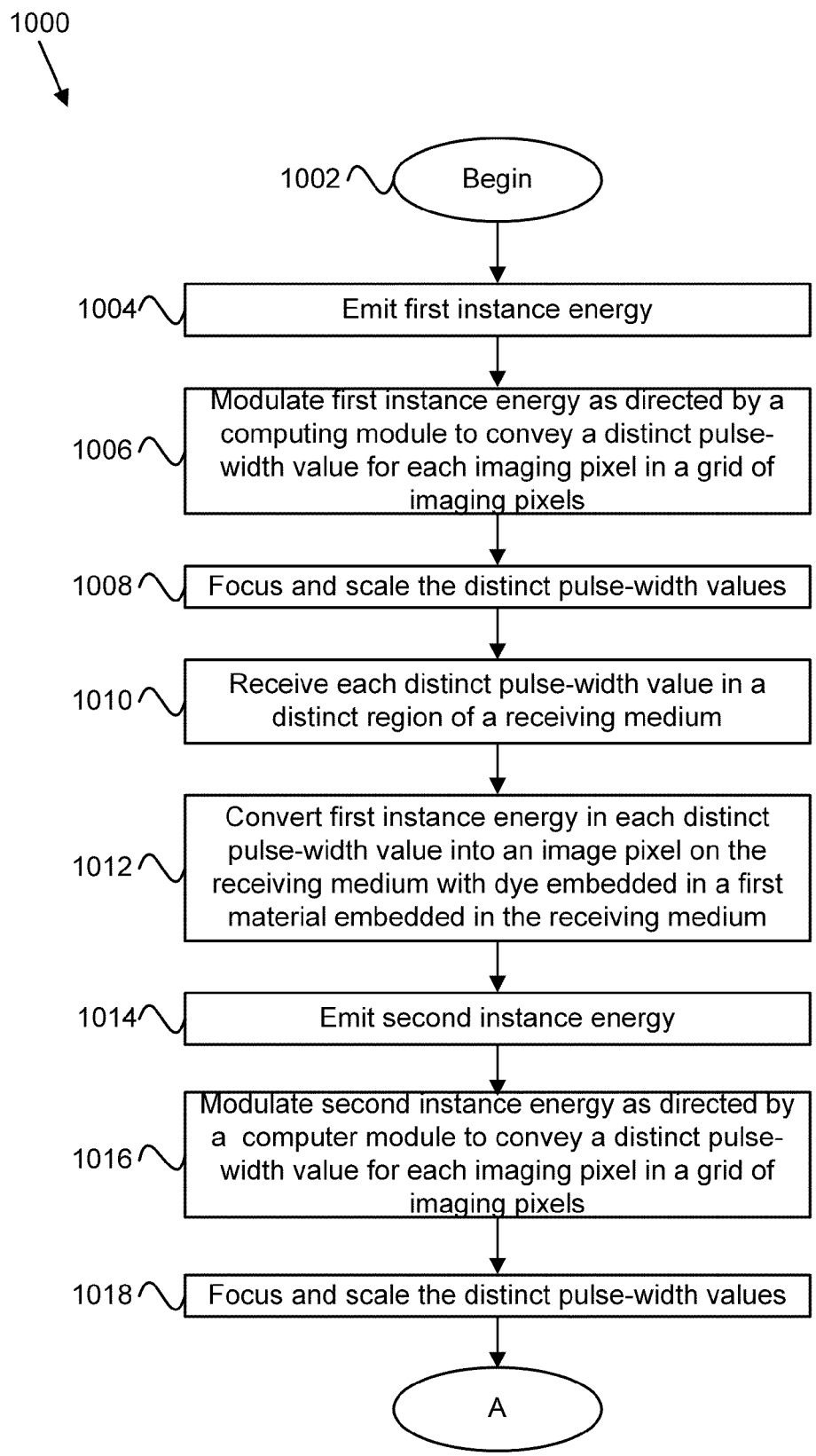
FIGS. 10A and 10B are a schematic flow chart diagram illustrating a second embodiment of a flash printing method in accordance with the present subject matter.
Figure 10B:
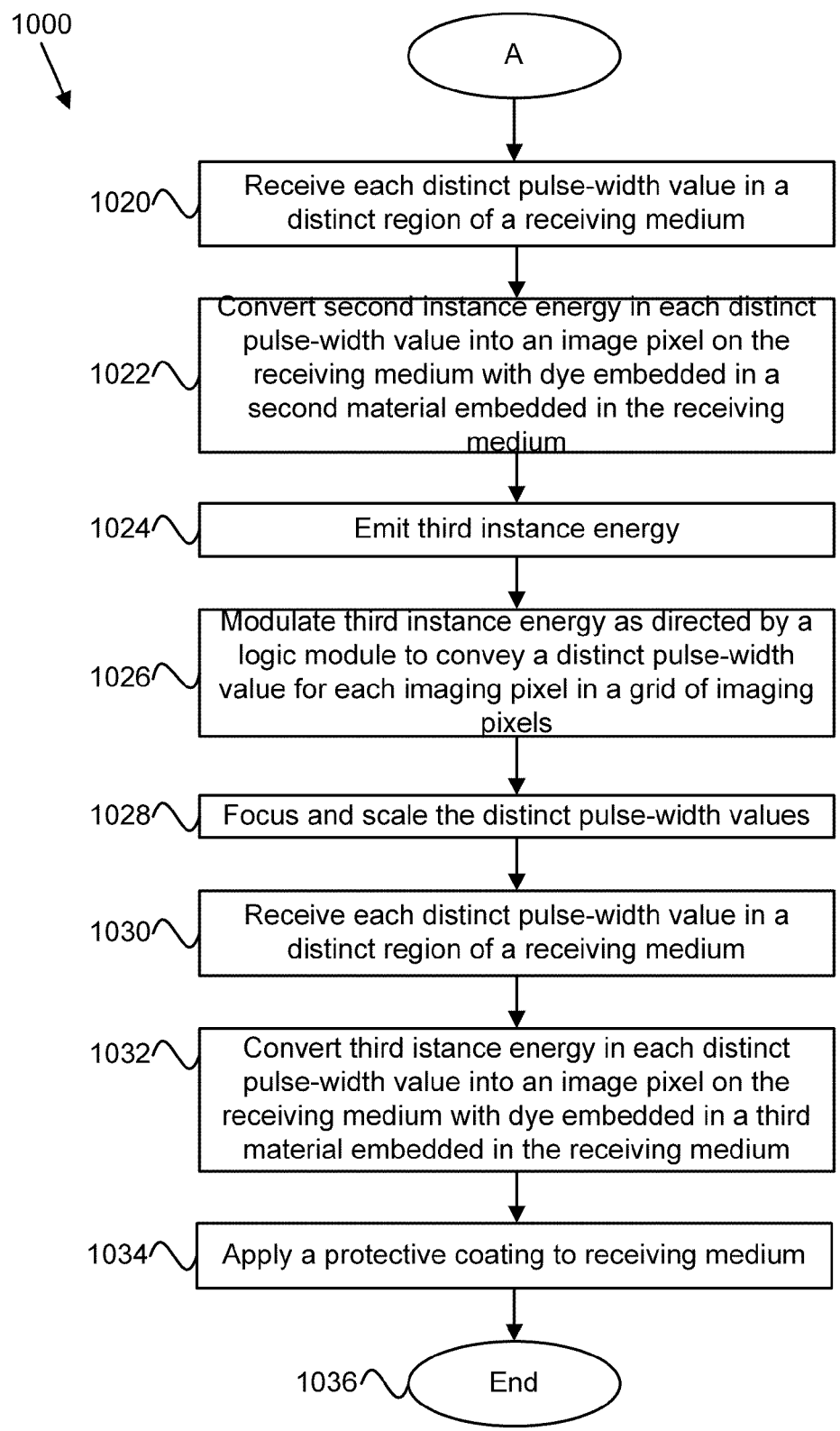

FIGS. 10A and 10B are a schematic flow chart diagram illustrating a second embodiment of a flash printing method 1000 in accordance with the present subject matter. The method 1000 begins 1002 and a first instance 204 from an energy module 202 emits 1004 first instance energy. A pulse width module 210 modulates 1006 first instance energy as directed by a logic module 214 to convey a distinct pulse-width value for each imaging pixel in a grid of imaging pixels 212. The logic module 214 stores in memory 216 and/or processes with a central processing unit 218 digital information about how to modulate 1006 each imaging pixel in the grid of imaging pixels 212 so as to realize an image (not shown) on a receiving medium 222.

Next, a focus and scaling module 216 focuses and scales 1008 the distinct pulse-width values to effectively render an image on the receiving medium 222. The focused and scaled, distinct pulse-width values are each received 1010 in a distinct region of the receiving medium 222. A first material 226 embedded, in certain embodiments, in a host material 224 on the receiving medium 222, converts 1012 first instance energy in each distinct pulse-width value into an image pixel on the receiving medium 222 by releasing a first dye 228. The first dye 228 may be encapsulated in the first material 226, which responds to first instance energy by releasing first dye 228 in proportion to the first instance energy in the impinging pulse-width value.

Next, a second instance 206 of an energy module 202 emits 1014 second instance energy. The method 1000 proceeds with steps of modulating 1016, focusing and scaling 1018, receiving 1020, and converting 1022 the second instance energy with steps substantially similar to the steps of modulating 1006, focusing and scaling 1008, receiving 1010, and converting 1012 described above with respect to first instance energy. Similarly, a third instance 208 of an energy module 202 then emits 1024 third instance energy. Again, the method 1000 proceeds with steps of modulating 1026, focusing and scaling 1028, receiving 1030, and converting 1032 the second instance energy with steps substantially similar to the steps described above with respect to first and second instance energy.

The step of converting 1022 with respect to the second material 230 and the step of converting 1032 with respect to the third material 234, involve a second dye 232 embedded in a second material 230 and a third dye 236 embedded in a third material 234, respectively. The first dye 228, second dye 232, and third dye 236 are each a different color. In certain embodiments, the first dye 228 is cyan; the second dye 232 is magenta; and, the third dye 236 is yellow.

The combination of the three dyes, released into the receiving medium 222 in varying amounts in different regions of the receiving medium 222, produces a color image. Because the second material 230 and the third material 234 are not sensitive to the particular wavelength, frequency, or power emitted by the first instance 204, second dye 232 and third dye 236 are not released into the receiving medium 222 by first instance energy. Similarly, the second material 230 may be the material sensitive to the second instance 206, and the third material 234 may be the material sensitive to the third instance 208. Once the first dye 228, second dye 232, and third dye 236 have been released, a finishing module 228 applies 1034 a protective coating to the receiving medium 222, and the method 1000 ends 1036.

In certain embodiments, at least one of the three dyes 228, 232, 236 embodies the conductive ink 704 of FIG. 7, resulting in a RFID 700. In some embodiments, at least one of the three dyes 228, 232, 236 embodies the raised ink dots 804 of FIG. 8, resulting in Braille lettering 800.

Figure 11:
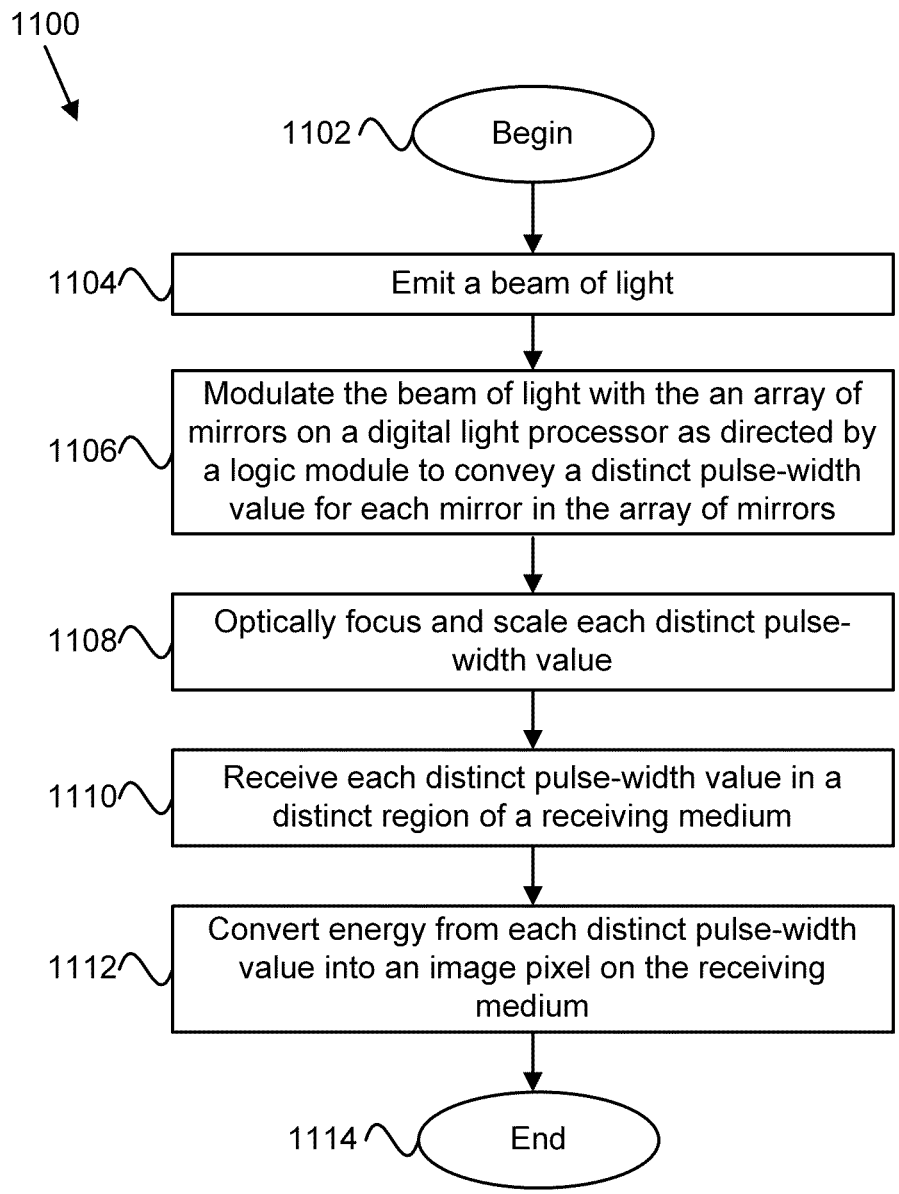
FIG. 11 is a schematic flow chart diagram illustrating one embodiment of a flash printing method utilizing a digital light processor in accordance with the present subject matter.

FIG. 11 is a schematic flow chart diagram illustrating one embodiment of a flash printing method 1100 utilizing a digital light processor in accordance with the present subject matter. The method 1100 begins 1102 and a light source 302 emits 1104 a beam of light 304. A logic module 314 then modulates 1106 the beam of light 304 with an array of mirrors 312a-312n on a digital light processor 310 to convey a distinct pulse-width value for each mirror 312a-312n in the array of mirrors 312a-312n. An optical module 316 then optically focuses and scales 1108 each distinct pulse-width value to render an image on a receiving medium 322. Next, the receiving medium 322 and/or host material receives 1110 each distinct pulse-width value in a distinct region of the receiving medium 322 and/or host material.

The receiving medium 322 and/or host material converts 1112 energy from each distinct pulse-width value into an image pixel on the receiving medium 322, and the method 1100 ends 1114. In certain embodiments, the imaging pixel embodies the conductive ink 704 of FIG. 7, resulting in a RFID 700. In some embodiments, the imaging pixel embodies the raised ink dots 804 of FIG. 8, resulting in Braille lettering 800.

Figure 12A:
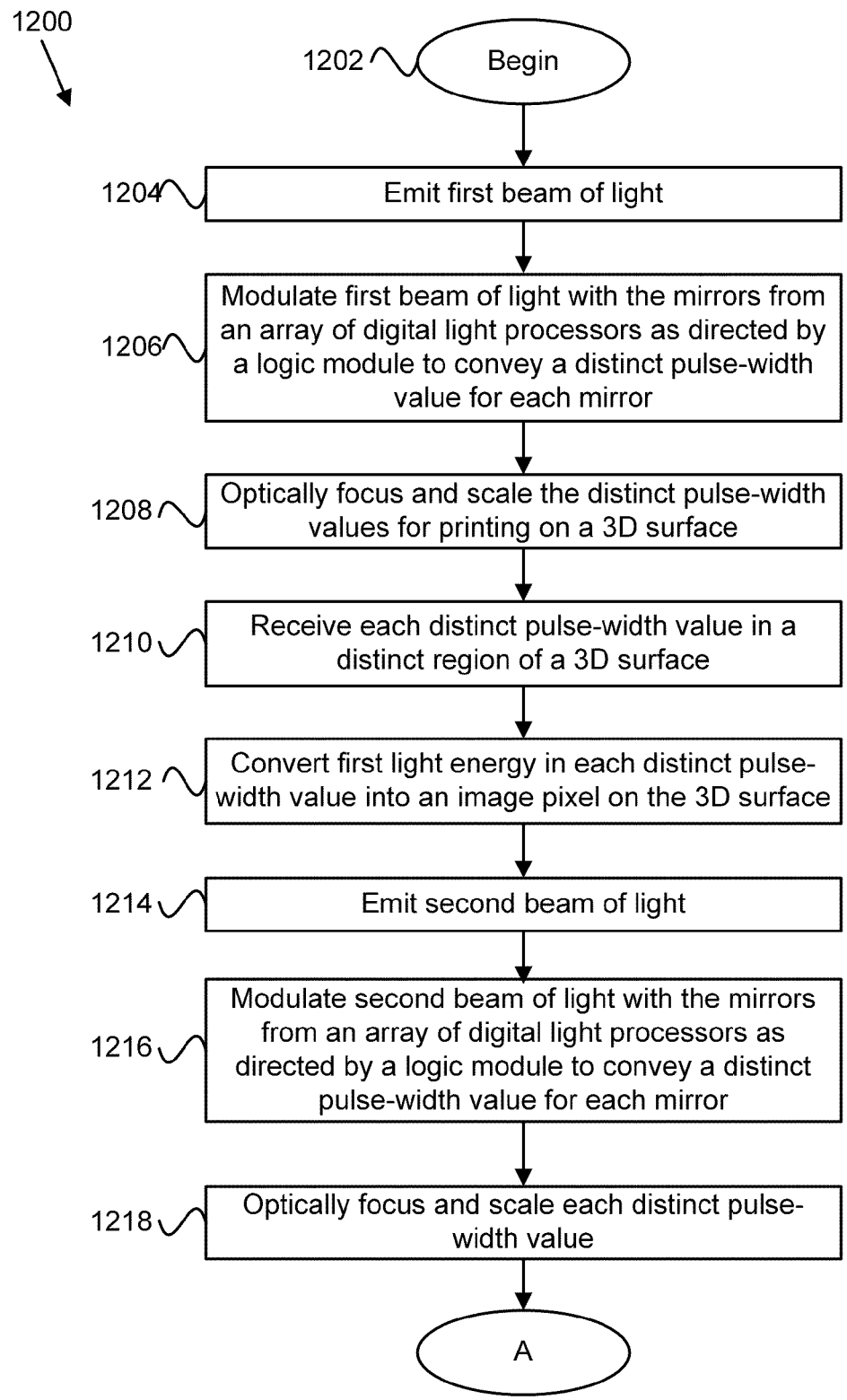
FIGS. 12A and 12B are a schematic flow chart diagram illustrating a second embodiment of a flash printing method utilizing multiple light sources, an array of digital light processors, and a three-dimensional optical module in accordance with the present subject matter.
Figure 12B:
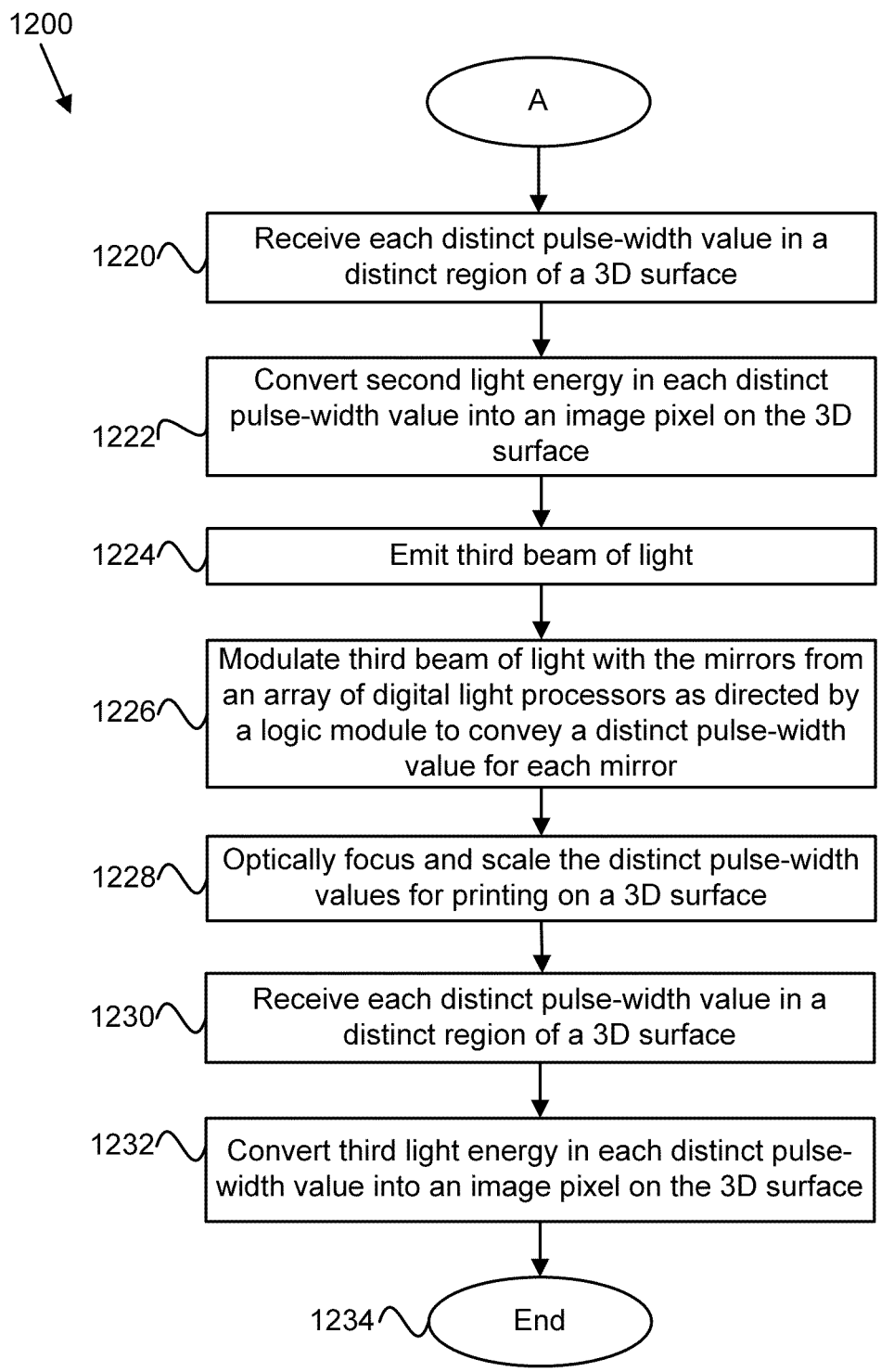

FIGS. 12A and 12B are a schematic flow chart diagram illustrating a second embodiment of a flash printing method 1200 utilizing multiple light sources, an array of digital light processors, and a three-dimensional optical module in accordance with the present subject matter. The method 1200 begins 1202 and a first light source 404 of multiple light sources 402 emits 1204 a first beam of light. A logic module 414 then modulates 1206 multiple arrays of mirrors 412a-412n on digital light processors 410a-410n that are part of an array of digital light processors 410 to convey a distinct pulse-width value for each mirror 412a-412n. An optical module 416 then optically focuses and scales 1208 each distinct pulse width value to render an image on a three-dimensional surface 422 and/or host material.

Next, the focused and scaled, distinct pulse-width values are each received 1210 in a distinct region of the three-dimensional surface 422 and/or host material. The three-dimensional surface 422 converts 1212 energy from each distinct pulse-width value into an image pixel of a particular color on the three dimensional surface 422. Next, a second light source 406 of multiple light sources 402 emits 1214 a second beam of light.

The method 1200 proceeds with steps of modulating 1216, optically focusing and scaling 1218, receiving 1220, and converting 1222 the second beam of light with steps substantially similar to the steps of modulating 1206, optically focusing and scaling 1208, receiving 1210, and converting 1212 described above with respect to the first beam of light. As a result, the three-dimensional surface 422 displays a second color image of a color distinction from the color image laid down by the first beam of light. Similarly, a third light source 408 of multiple light sources 402 then emits 1224 a third light beam. Again, the method 1200 proceeds with steps of modulating 1226, focusing and scaling 1228, receiving 1230, and converting 1232 the third beam of light with steps substantially similar to the steps described above with respect to first and second beams of light, and the method 1200 ends 1234. As a result, a third color image is laid down on the three-dimensional surface, where the third color is distinct from the first and second colors. The three color images combine to produce one color image. In certain embodiments, at least one of the color images embodies the conductive ink 704 of FIG. 7, resulting in a RFID 700. In some embodiments, at least one of the color images embodies the raised ink dots 804 of FIG. 8, resulting in Braille lettering 800.

Figure 13:
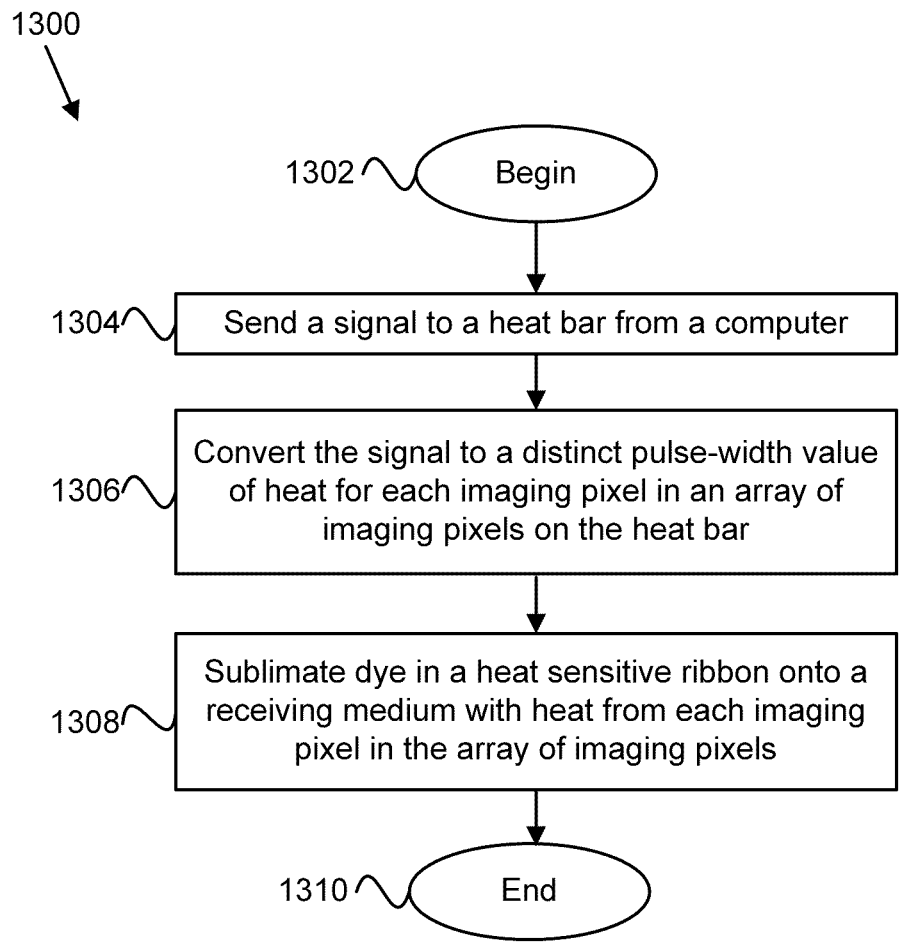
FIG. 13 is a schematic flow chart diagram illustrating one embodiment of a flash printing method utilizing a heating bar and a heat-sensitive ribbon in accordance with the present subject matter.

FIG. 13 is a schematic flow chart diagram illustrating one embodiment of a flash printing method 1300 utilizing a heating bar and a heat-sensitive ribbon in accordance with the present subject matter. The method 1300 begins 1302 and a logic module 514 sends a signal 1304 to a heat bar 502. The heat bar 502 converts the signal 1306 to a distinct pulse-width value of heat for each imaging pixel in an array of imaging pixels 512a-512n on the bottom of the heat bar 502.

The method 1300 continues with each imaging pixel 512a-512n of the array of imaging pixels 512a-512n sublimating dye 1308 from a heat sensitive ribbon 524 directly underneath the array of imaging pixels 512a-512n unto a receiving medium 522 directly below the heat sensitive ribbon 524. The method 1300 then ends 1310. In certain embodiments, the dye embodies the conductive ink 704 of FIG. 7, resulting in a RFID 700. In some embodiments, the dye embodies the raised ink dots 804 of FIG. 8, resulting in Braille lettering 800.

Figure 14A:
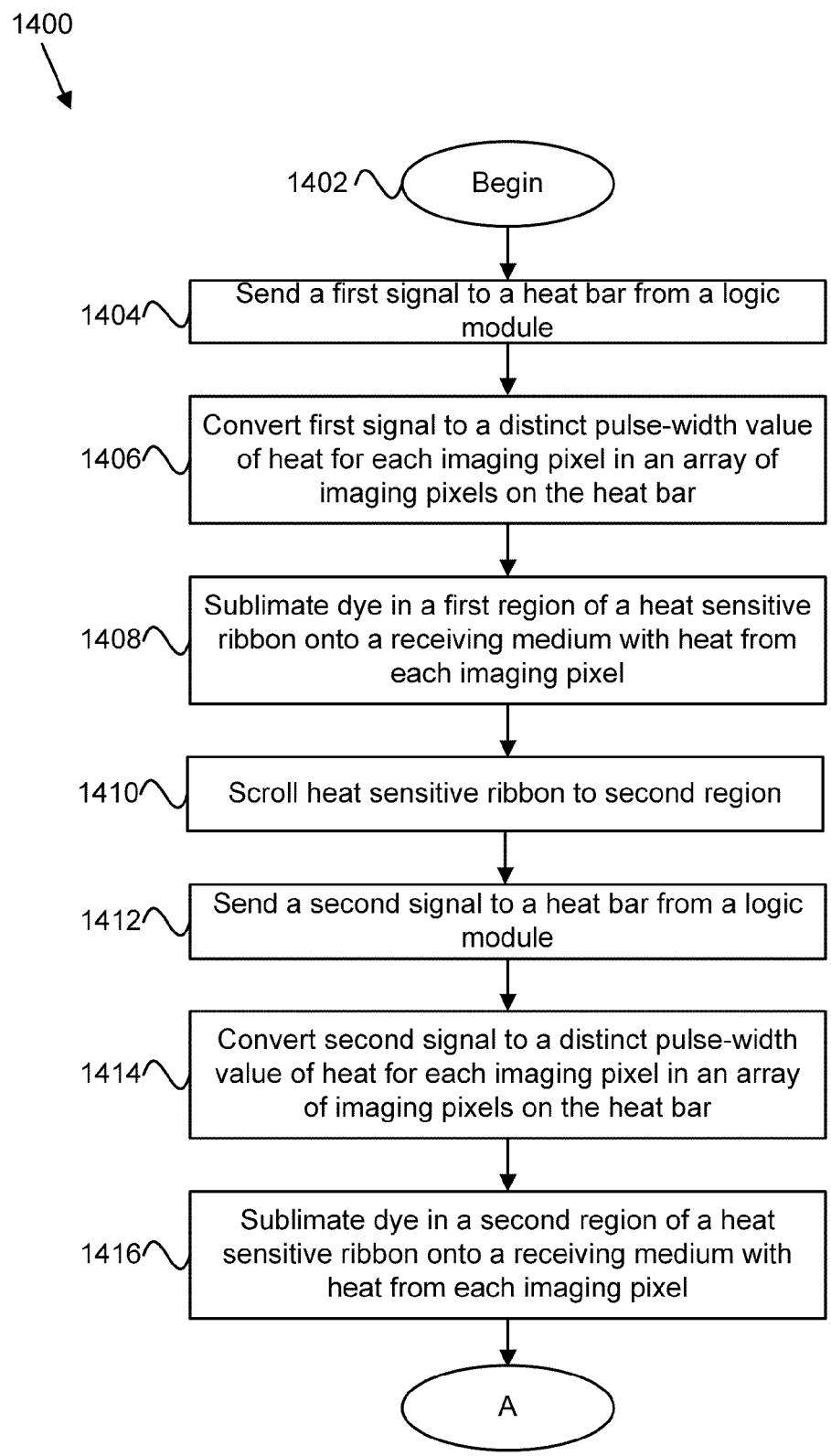
FIGS. 14A and 14B are a schematic flow chart diagram illustrating a second embodiment of a flash printing method utilizing a heating bar, a three-part, heat-sensitive ribbon, and a finishing module, in accordance with the present subject matter.
Figure 14B:
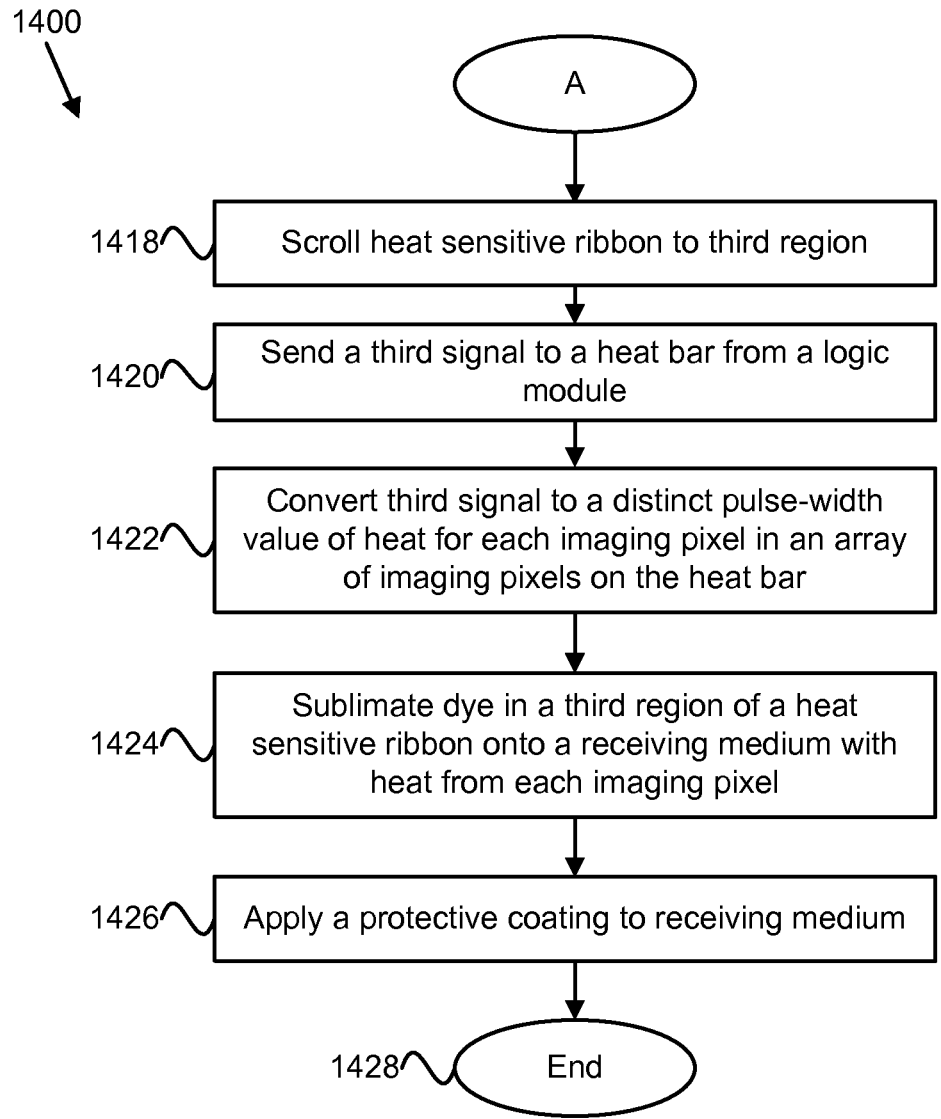

FIGS. 14A and 14B are a schematic flow chart diagram illustrating a second embodiment of a flash printing method 1400 utilizing a heating bar, a three-part, heat-sensitive ribbon, and a finishing module, in accordance with the present subject matter. The method 1400 begins 1402 and a logic module 614 sends a first signal 1404 to a heat bar 602. The heat bar 602 converts the first signal 1406 to a distinct pulse-width value of heat for each imaging pixel in an array of imaging pixels 612a-612n on the bottom of the heat bar 602. Then each imaging pixel 612a-612n of the array of imaging pixels 612a-612n sublimates dye 1408 from a first region 626 of a heat sensitive ribbon 624 directly underneath the array of imaging pixels 612a-612n unto a receiving medium 622 directly below the heat sensitive ribbon 624.

Next, the two-part ribbon scroll 616a, 616b scrolls 1410 the heat sensitive ribbon 624 to a second region 630. The method 1400 proceeds with steps of sending a second signal 1412, converting the second signal 1414, and sublimating dye 1416 substantially similar to the steps of sending a first signal 1404, converting a first signal 1406, and sublimating dye 1408 described above with respect to the first signal, except that the sublimated dye may be of a different color and results in a different pattern.

The two-part ribbon scroll 616a, 616b then scrolls 1418 the heat sensitive ribbon 624 to a third region 634. Again, the method 1400 proceeds with steps of sending a third signal 1420, converting the third signal 1422, and sublimating dye 1424 that are substantially similar to the steps described above with respect to the first and second signals, except that the sublimated dye may be of a different color and results in a different pattern from the colors and patterns associated with the first and second signals.

The combination of the three dyes, released into the receiving medium 622 in varying amounts in different regions of the receiving medium 622, produces a color image. Once all three dyes have been sublimated, a finishing module 628 applies 1426 a protective coating to the receiving medium 622, and the method 1400 ends 1428. In certain embodiments, at least one of the three dyes embodies the conductive ink 704 of FIG. 7, resulting in a RFID 700. In some embodiments, at least one of the dyes embodies the raised ink dots 804 of FIG. 8, resulting in Braille lettering 800.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to flash print an image, the apparatus comprising:
an energy source that delivers energy;
an energy pulse width modulator coupled to the energy source, the energy pulse width modulator receiving energy from the energy source and modulating the energy received from the energy source, the energy pulse width modulator driven by a logic module;
a plurality of imaging pixels modulated by the energy pulse width modulator and conveying modulated energy to a host material, the host material in close proximity to a receiving medium, the modulated energy releasing dye from the host material into the receiving medium,
wherein the receiving medium comprises a curved surface and the logic module adjusts pulse-width values of the energy pulse width modulator for the imaging pixels based on distances to corresponding regions of the curved surface.

2. The apparatus of claim 1, wherein the pulse width modulator comprises a digital light processor.

3. The apparatus of claim 2, further comprising a filter in between the energy source and the digital light processor.

4. The apparatus of claim 2, further comprising a plurality of filters positionable in between the energy source and the digital light processor, wherein each filter selects a distinct wavelength.

5. The apparatus of claim 1, wherein the energy source comprises one of a laser, an infrared lamp, a light emitting diode, a plurality of lasers wherein each laser emits a distinct wavelength, a plurality of infrared lamps wherein each infrared lamp emits a distinct wavelength, and a plurality of light emitting diodes wherein each light emitting diode emits a distinct wavelength.

6. The apparatus of claim 1, further comprising an optical module that focuses and scales energy from the plurality of imaging pixels onto hosting material in close proximity to the receiving medium.

7. The apparatus of claim 6, wherein the optical module focuses and scales the modulated energy to account for the curved surface of the receiving medium.

8. The apparatus of claim 1, wherein the receiving medium comprises a substrate for a radio frequency identification substrate.

9. The apparatus of claim 8, wherein the dye comprises a conductive ink.

10. The apparatus of claim 1, wherein the host material comprises one or more of a dye ribbon, a plurality of dye-filled microspheres, and dye-filled nanoparticles.

11. The apparatus of claim 1, wherein the receiving medium comprises a substrate for receiving Braille lettering.

12. The apparatus of claim 11, wherein the dye comprises a clear plastic.

13. The apparatus of claim 1, further comprising a plurality of pulse width modules arrayed to relay modulated energy over a larger surface array of the receiving medium.

14. A method to flash print an image, the method comprising:
emitting energy to an energy pulse width modulator;
modulating the energy with the energy pulse width modulator along a plurality of imaging pixels as directed by a logic module;
conveying the modulated energy to a host material, the host material in close proximity to a receiving medium, the receiving medium comprising a curved surface, the modulated energy releasing dye from the host material into the receiving medium;
adjusting pulse-width values of the energy pulse width modulator for the imaging pixels based on distances to corresponding regions of the curved surface.

15. The method of claim 14, wherein the host material further comprises a plurality of dye-filled microspheres and wherein conveying the modulated energy to a host material further comprises reflecting light from a matrix of micro mirrors to the plurality of dye-filled microspheres and activating the microspheres with the reflected light, to release dye in various volumes from the microspheres.

16. The method of claim 14, wherein modulating the energy with the energy pulse width modulator further comprises modulating the energy to convey a distinct pulse-width value.

17. The method of claim 14, further comprising focusing and scaling the modulated energy to account for the curved surface of the receiving medium.

18. The method of claim 17, wherein the host material further comprises a plurality of dye-filled microspheres, the method further comprising attaching the plurality of dye-filled microspheres to the curved surface.

19. The method of claim 14, wherein emitting energy to an energy pulse width modulator further comprises emitting a first instance energy, emitting a second instance energy, and emitting a third instance energy, and wherein modulating the energy with the energy pulse width modulator further comprises modulating the first instance energy to convey a first distinct pulse-width value, modulating the second instance energy to convey a second distinct pulse-width value, and modulating the third instance energy to convey a third distinct pulse-width value, and wherein conveying the modulated energy to a host material further comprises conveying the first pulse-width value to the host material wherein the host material releases a first dye, conveying the second pulse-width value to the host material wherein the host material releases a second dye, and conveying the third pulse-width value to the host material wherein the host material releases a third dye.

* * * * *